US012560730B2

(12) United States Patent
Ozdemir et al.

(10) Patent No.: US 12,560,730 B2
(45) Date of Patent: Feb. 24, 2026

(54) COMPRESSIVE SENSING MARINE STREAMER SYSTEM

(71) Applicant: Reflection Marine Norge AS, Bergen (NO)

(72) Inventors: Ahmet Kemal Ozdemir, Cambridge (GB); Jon-Fredrik Hopperstad, Cambridge (GB)

(73) Assignee: REFLECTION MARINE NORGE AS, Laksevag (NO)

( * ) Notice: Subject to any disclaimer, the term of this patent is extended or adjusted under 35 U.S.C. 154(b) by 0 days.

(21) Appl. No.: 18/416,373

(22) Filed: Jan. 18, 2024

(65) Prior Publication Data

US 2024/0168187 A1 May 23, 2024

Related U.S. Application Data

(63) Continuation of application No. 16/753,527, filed as application No. PCT/US2018/054410 on Oct. 4, 2018, now Pat. No. 11,914,088.

(Continued)

(51) Int. Cl.
G01V 1/20 (2006.01)
G01V 1/16 (2006.01)
(Continued)

(52) U.S. Cl.
CPC .............. G01V 1/201 (2013.01); G01V 1/168 (2013.01); G01V 1/184 (2013.01); G01V 1/364 (2013.01);
(Continued)

(58) Field of Classification Search
CPC ................ G01V 1/201; G01V 1/3808; G01V 2210/1423
See application file for complete search history.

(56) References Cited

U.S. PATENT DOCUMENTS 8,897,094 B2 * 11/2014 Eick .......................... G01V 1/20
367/17
2006/0175427 A1 8/2006 Jonientz et al.
(Continued)

FOREIGN PATENT DOCUMENTS

EP 2824483 A1 1/2015
WO 2016201005 A1 12/2016
(Continued)

OTHER PUBLICATIONS

International Search Report and Written Opinion issued in International Application No. PCT/US2018/054410 dated Nov. 29, 2018.
(Continued)

*Primary Examiner* — Abdallah Abulaban
(74) *Attorney, Agent, or Firm* — Mark H. Whittenberger; Holland & Knight LLP

(57) ABSTRACT

Embodiments included herein are directed towards a marine seismic streamer. The seismic streamer may include an outer skin formed in longitudinally extending tubular shape, an inner surface of the outer skin defining an internal volume containing a gel substance. The seismic streamer may also include a plurality of micro-electro-mechanical ("MEMS") sensors and plurality of hydrophones associated with the outer skin, wherein in the plurality of MEMS sensors are spaced non-uniformly in the seismic streamer along an axial direction of the streamer, such that not more than 100 MEMS sensors are located in the seismic streamer over a continuous 100 meter axial length of seismic streamer. The seismic streamer may further include an electronics system extending axially through an inside portion of the outer skin and a strength member core extending axially through an inside portion of the outer skin.

18 Claims, 15 Drawing Sheets

Related U.S. Application Data

(60) Provisional application No. 62/570,026, filed on Oct. 9, 2017, provisional application No. 62/568,141, filed on Oct. 4, 2017.

(51) Int. Cl.
  G01V 1/18     (2006.01)
  G01V 1/36     (2006.01)
  G01V 1/38     (2006.01)

(52) U.S. Cl.
  CPC .......... G01V 1/3808 (2013.01); G01V 1/3817 (2013.01); G01V 1/3843 (2013.01); *G01V 1/3852* (2013.01); *G01V 2210/1423* (2013.01); *G01V 2210/56* (2013.01)

(56)         References Cited

U.S. PATENT DOCUMENTS

| | | | |
|---|---|---|---|
| 2010/0020644 A1 | 1/2010 | Vignaux | |
| 2010/0187806 A1 | 7/2010 | Kaule et al. | |
| 2014/0140171 A1* | 5/2014 | Sollner | G01V 1/3808 |
| | | | 367/21 |

| | | | |
|---|---|---|---|
| 2014/0269180 A1 | 9/2014 | Tenghamn et al. | |
| 2014/0288841 A1* | 9/2014 | Ozdemir | G01V 1/38 |
| | | | 702/17 |
| 2015/0100235 A1 | 4/2015 | Jones et al. | |
| 2015/0117147 A1 | 4/2015 | Hegge et al. | |
| 2015/0308864 A1 | 10/2015 | Paulsson et al. | |
| 2015/0316667 A1* | 11/2015 | Projetti | G01V 1/3808 |
| | | | 73/514.02 |
| 2017/0153342 A1 | 6/2017 | Ricks | |
| 2017/0176614 A1* | 6/2017 | Alhukail | G01V 1/32 |

FOREIGN PATENT DOCUMENTS

| | | | |
|---|---|---|---|
| WO | 2017112027 A1 | 6/2017 | |
| WO | 2017112436 A1 | 6/2017 | |
| WO | 2019071004 A1 | 4/2019 | |

OTHER PUBLICATIONS

Mosher, Charles et al., "Increasing the efficiency of Seismic Data Acquisition via Compressive Sensing," The Leading Edge, Apr. 1, 2014 (Apr. 1, 2014), pp. 386-391, XP055539684, DOI: 10.1190/tle33040386.1.

* cited by examiner

OFFSET [m]

FIG. 13

COMPRESSIVE SENSING MARINE STREAMER SYSTEM

CROSS-REFERENCE TO RELATED APPLICATIONS

This application claims is a continuation of U.S. National Stage Application Ser. No. 16/753,527, filed on Apr. 3, 2020 which claims benefit of PCT Application Ser. No. PCT/US2018/054410, filed on Oct. 4, 2018 which claims benefit of U.S. Provisional Application having Ser. No. 62/568,141 filed on Oct. 4, 2017, and U.S. Provisional Application having Ser. No. 62/570,026 filed on Oct. 9, 2017, the entire contents of which are incorporated herein by reference in their entirety.

BACKGROUND

This section provides background information to facilitate a better understanding of the various aspects of the disclosure. It should be understood that the statements in this section of this document are to be read in this light, and not as admissions of prior art. Seismic surveys are used to determine various features of an earth formation, such as the presence or lack thereof of various minerals. Seismic surveys can be used to determine if hydrocarbon deposits are present in an earth formation. A seismic survey can be performed by using a seismic source to produce an impulse that travels into an earth formation thereby reverberating and/or reflecting off of the earth formation. The reverberations and/or reflections are then detected and recorded by a seismic sensor and recording system. The data that is derived therefrom can be analyzed and used to determine characteristics of the formation. It is possible to display such in a visual form, or keep it in digital data form.

One type of seismic survey takes place on land and is called a land seismic survey. In land seismic surveys an impulse is introduced into the formation and seismic sensors are placed in contact with the formation (on and/or into the formation). The sensors can be hydrophones, geophones, or other general types of sensors capable of detecting the reverberations and/or reflections of the impulse. It is possible to use a large spread of interconnected sensors that in turn connect with a recording device(s). Some of the issues encountered in a land survey are lighting strikes, animal damage (e.g., rats chewing cables), and other degradations caused by the elements. The sensors in a spread can be connected by way of wireless communication, cabled communication, or a combination thereof. Sensors can also be in what is called a "blind" configuration, where a sensor or group of sensors are connected to a recording device that is independent of a central recording unit, and is scavenged at various times in various ways.

Another type of survey is a marine seismic survey, and within that a towed marine seismic survey. In a towed marine seismic survey a boat tows a series of seismic streamers. Seismic streamers are cables that have integrated thereto and/or therein seismic sensors. In the same spirit as a land survey, a marine seismic survey introduces an impulse to the earth formation. The impulse can be created by air guns or marine vibrators. The impulse(s) can travel through the water and into the formation, where they reverberate and/or reflect. The reverberations and/or reflections travel back through the water and are detected by the seismic sensors on the streamers and can be recorded. The data that is derived therefrom can be analyzed and used to determine characteristics of the formation. It is possible to display such in a visual form, or keep it in data form. It is also possible to use seismic sensors that are located on the seabed.

Though potentially relevant in all seismic surveys, there is value in obtaining multi-component seismic data as such can facilitate numerous data processing aspects such as deghosting, noise removal, and other attenuation and processing techniques. That being said, the cost of the equipment is relevant with respect to its commercial usefulness. Multi-component data can be considered to be directional particle motion data for multiple directions, pressure data, rotational data, or a combination thereof.

SUMMARY OF DISCLOSURE

In one implementation, a marine seismic streamer is provided. The marine seismic streamer may include an outer skin formed in a longitudinally extending tubular shape, an inner surface of the outer skin defining an internal volume containing a gel substance. The seismic streamer may also include a plurality of micro-electro-mechanical ("MEMS") sensors and a plurality of hydrophones associated with the outer skin, wherein the plurality of MEMS sensors are spaced non-uniformly in the seismic streamer along an axial direction of the streamer, such that not more than 100 MEMS sensors are located in the seismic streamer over a continuous 100 meter axial length of seismic streamer. The marine seismic streamer may further include an electronics core extending axially through an inside portion of the outer skin, wherein the plurality of MEMS sensors are in electrical communication with the electronics core. The marine seismic streamer may also include a strength member core extending axially through an inside portion of the outer skin.

In some implementations, at least two of the plurality of MEMS sensors may be placed adjacent to one another at a 0.39 meter or less spacing therebetween. In another implementation the plurality of MEMS sensors may be placed adjacent to one another at a 0.5 meter or less spacing therebetween. The plurality of MEMS sensors may include no more than 80 MEMS sensors over the continuous 100 meter length of seismic streamer. The plurality of MEMS sensors may be spaced at an average spacing that is greater than spatial Nyquist interval for over the continuous 100 meter length of the seismic streamer. One or more adjacent MEMS sensors of the plurality of MEMS sensors may include an average spacing therebetween of between 1 and 4 meters. The average spacing may be greater than approximately 1.78 meters. The sensors may be irregularly spaced with respect to one another in the axial direction. The marine seismic streamer may further comprise a first sensor attached to a first side of the outer skin and a second sensor attached to a second side of the outer skin. The plurality of sensors may include three component ("3C") MEMS sensors. The marine seismic streamer may further comprise one or more seismic streamer orientation detection devices configured to determine a relative position of at least a portion of the seismic streamer.

In another implementation, a method for performing a seismic survey is provided. The method may include towing a marine seismic streamer having an outer skin formed in a longitudinally extending tubular shape, an inner surface of the outer skin defining an internal volume containing a gel substance. The method may also include acquiring seismic data using a plurality of sensors and a plurality of hydrophones associated with the outer skin, wherein the plurality of sensors include a pre-determined maximum number of sensors in the seismic streamer for every continuous 100 meter length of seismic streamer, wherein the number of sensors are spaced apart from one another axially along the streamer non-uniformly at an average spacing over the continuous 100 meter length of the seismic streamer that is greater than spatial Nyquist interval. The method may further include communicating the seismic data to an electronics system extending axially through an inside portion of the outer skin, wherein the plurality of sensors are in electrical communication with the electronics system.

In some implementations, the pre-determined number of sensors may be no more than 80. At least two of the plurality of MEMS sensors may be placed adjacent to one another in the axial direction along the streamer and have a 0.39 meter or less spacing therebetween. The plurality of sensors may include three component ("3C") sensors.

In one implementation, a marine seismic streamer is provided. The marine seismic streamer may include an outer skin formed in a longitudinally extending tubular shape, an inner surface of the outer skin defining an internal volume containing a gel substance. The seismic streamer may also include a plurality of particle motion sensors and a plurality of hydrophones associated with the outer skin, wherein the plurality of particle motion sensors are spaced non-uniformly in the seismic streamer along an axial direction of the streamer, such that not more than 100 particle motion sensors are located in the seismic streamer over a continuous 100 meter axial length of seismic streamer. The particle motion sensors may be nonuniformly distributed over the continuous 100 meter axial length of the seismic streamer, in a pattern that repeats at a distance greater than 12.5 meters. The marine seismic streamer may further include an electronics core extending axially through an inside portion of the outer skin, wherein the plurality of particle motion sensors are in electrical communication with the electronics core. The marine seismic streamer may also include a strength member core extending axially through an inside portion of the outer skin.

In some implementations, the particle motion sensors may be nonuniformly distributed over the continuous 100 meter axial length of the seismic streamer, in a pattern that repeats at a distance greater than 50 meters.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 13 illustrates an example of a sparse array according to one or more aspects of the disclosure;

Like reference symbols in the various drawings may indicate like elements.

DETAILED DESCRIPTION

The following description concerns a number of embodiments and is meant to provide an understanding of the embodiments. The description is not in any way meant to unduly limit the scope of any present or subsequent related claims.

Figures 1A, 1B:
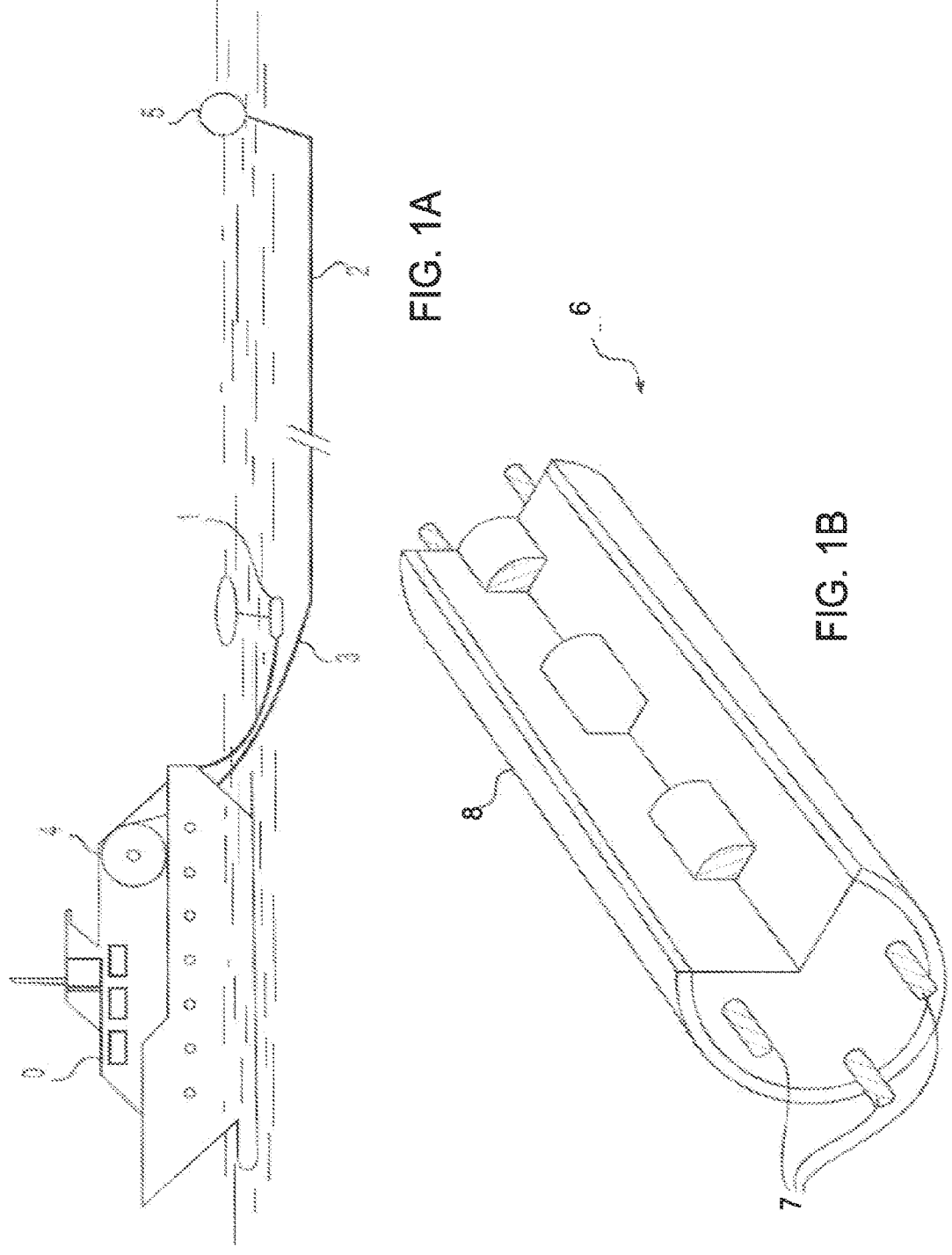
FIG. 1A is a generalized illustration of a seismic survey vessel towing an array of seismic streamers in accordance with a first implementation of the present disclosure.
FIG. 1B is a schematic cross-section illustrating a portion of a streamer cable employing an embodiment of the present disclosure.

FIG. 1A shows a seismic vessel towing an acoustic source and streamer through a body of water. The seismic vessel 0 pulls at least one seismic source 1 and at least one seismic streamer 2. The streamer 2 is secured to the vessel 0 by a lead-in cable 3 which is attached to a cable storage reel 4 located aboard the vessel. A tail buoy 5 is attached to the distal end of the cable by a long stretch of rope or similar material. The tail buoy may optionally be provided with an acoustic, electromagnetic or visual device used to locate the end of the streamer cable.

As shown in FIG. 1B, each section of the streamer cable 2 contains a plurality of hydrophones 6 well known in the seismic art. The hydrophones are interconnected by a transmission line (not shown) to a remote recording device located aboard the vessel. Adjacent hydrophones are not wired so as to form groups which generate a single output. Instead, each hydrophone is set to generate a separate output $g_i$ which is subsequently filtered in a process as described below. Each section of the streamer cable may further include various sensors, such as MEMS sensors that are discussed below in FIGS. 11-13.

In addition the streamer cable contains strength members 7 designed to absorb the tensional stress applied to the cable while in tow. The sensing and strength components are surrounded by a plastic jacket 8 in the form of an elongated tube. The jacket is preferably filled with a lightweight ballast fluid to render the section neutrally or slightly positively buoyant. When full of fluid, the interior of the jacket is substantially at atmospheric pressure. The cylindrical form of the jacket is maintained by a plurality of bulkheads which are not shown.

As the streamer cable is towed through the body of water, air guns 1 are fired and the thus generated acoustic energy travels through the water layer and the formations beneath the ocean bottom. At various reflection points or planes, part of the acoustic energy is reflected. The hydrophones 6 cable receives the direct wavefield and any reflected or refracted wavefield traversing the streamer. The received wavefield is in most case heavily contaminated by noise from various sources.

To attenuate the unwanted noise in the received signals, the hydrophones 6 may be spaced at intervals of 3.125 meters. Even though experimental data suggests that better noise attenuation can be achieved with smaller sampling intervals of, say, 2.25 meters, optimal spacing is subject to a number of restrictions, such as available bandwidth for data transmission and recording or manufacturing costs. The above values for the hydrophone separation are derived from a wet (kerosene filled) streamer cable and modification of the sampling interval might be necessary for other types of streamers, such as solid and semi-solid streamers.

In combination with appropriate noise filtering methods as for example described below, the above chosen sampling spacing results in the reduction of unwanted noise, particularly coherent noise, such as bulge wave noise, swell noise, and crossflow noise.

Figure 2:
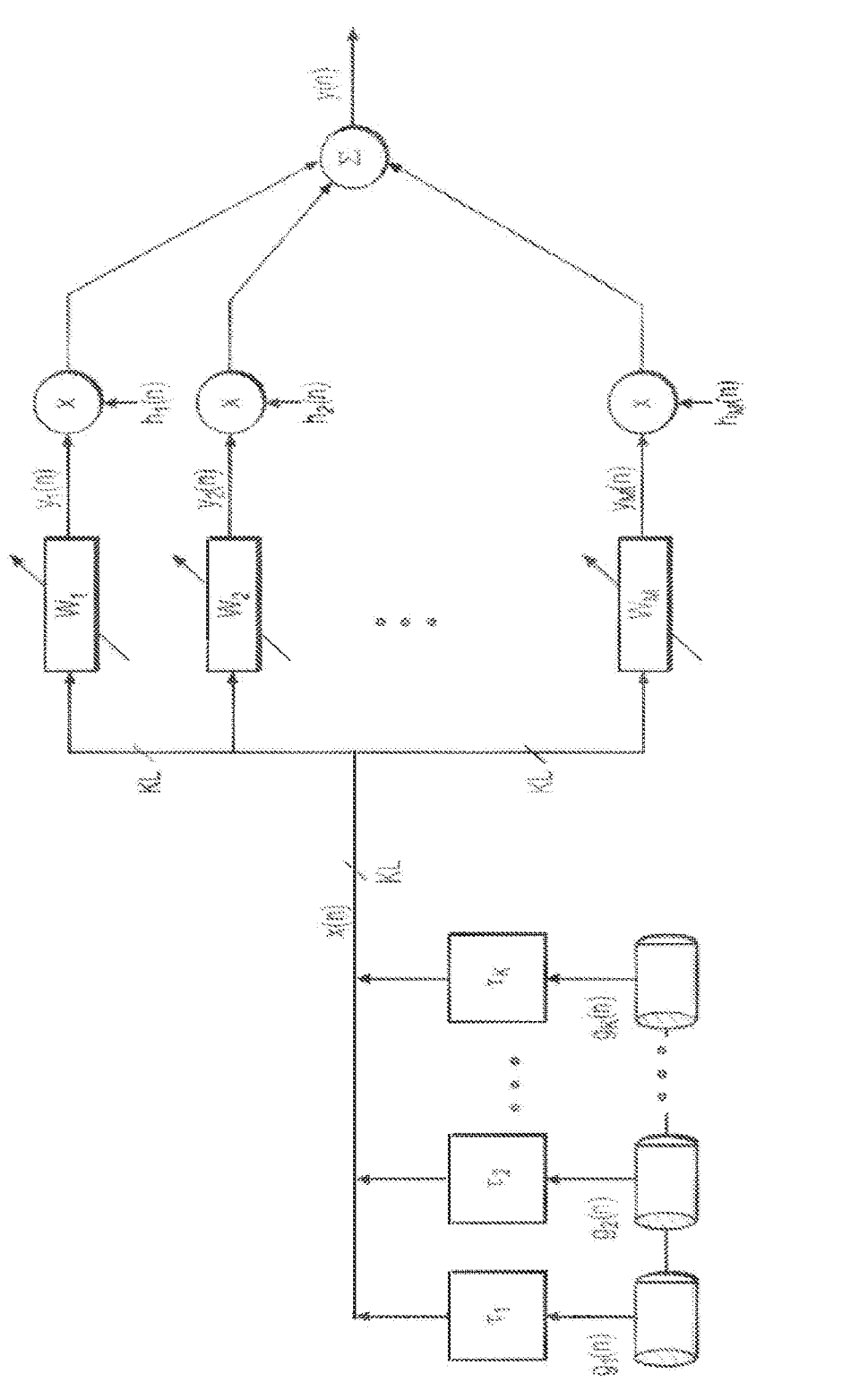
FIG. 2 shows a general block diagram of an adaptive beamformer in accordance with the present disclosure.

Referring now to FIG. 2, there is shown a general block diagram of an adaptive beamformer used as filter to reduce the noise of the single sensor recordings. It is assumed the presence of K sensors located at rk with k=1, . . . , K. Each sensor k records signal $g_k(n)$ with n=1, . . . , N using an A/D converter. The letter 'n' is used as an index on discrete time samples. The sampling interval is $\Delta t$. The signals $g_k(n)$ are beamsteered using delays $\tau_k$ towards a general "signal direction". This is the general direction from which the seismic signals are expected to arrive. The beamsteered channels $x_k(n)$ are processed by local multichannel adaptive filters to produce the output signal:

$$y(n) = \sum_{i=1}^{M}\sum_{k=1}^{K}\sum_{v=-L_1}^{L_2} h_i\ (n)w_{ikv}x_k(n-v)$$  [1]

where $w_{ikv}(t)$ are the adjustable coefficients of the adaptive filters, $h_i(n)$ are the windows applied at the output end, M is the number of local multichannel adaptive filters (or the number of output windows), and $L=L_1+L_{2+}1$ is the number of coefficients per channel. Here and below, a bar under a letter denotes a vector (small letter) or a matrix (capital letter)

Equation [1] can be rewritten as a (windowed) sum over a scalar product using a tap-input vector x(n) at time t defined as:

$$x(n)=[x_1(n+L_1), \ldots, x_1(n-L_2)\ x_2(n+L_1), \ldots, x_2(n-L_2),\ x_k(n+L_1), \ldots, x_k(n-L_2)]^T$$  [2]

and a tap-weight vector $w_i$ defined as $$w_i=[w_{i1}(-L_1), \ldots, w_{i1L_2}, w_{i2(-L)}, \ldots, w_{i2L_2}\ w_{iK(-L1)}, \ldots, w_{iKL_2}]^T$$  [3]

Using definitions [2] and [3], equation [1] becomes $$y(n) = \sum_{i=1}^{M}h_i\ (n)\underline{w}_i^T\underline{x}_k\ (n) = \sum_{i=1}^{M}h_i(n)\ \underline{x}^T(n)\underline{w}_i.$$  [4]

Equations [1] and [4] describe how to find the beamformer or filter bank output once the M tap-weight vectors $\underline{w}_i$ have been specified. These vectors are computed as the solution of an optimization problem which is described below.

The optimization problem is defined as $$\min_{\underline{w}_1,\ldots,\underline{w}_M} J = \min_{\underline{w}_1,\ldots,\underline{w}_M} \left\{ J_1 + \frac{\delta^2}{KL}J_2 \right\}$$  [5]

subject to constraints $$C^Tw_i=f$$  [6]

where i=1,2, . . . , M and J $$J_1 = \sum_{n=1}^{N}y^2\ (n\ \text{and}$$  [7]

$$J_2 = \sum_{i=1}^{M}\|\underline{w}_i\|^2\sum_{n=1}^{N}h_i\ (n)\|\underline{x}(n)\|^2,$$  [8]

KL is the total number of filter coefficients, and $\|.\|$ denotes the $L_2$ norm. This cost function is a linear combination of the output power of the beamformer (the first term in eq. [5]), and the so-called "white-noise gain" of the beamformer weighted by the input power (the second term in eq. [5]). The relative weight of the two terms is adjusted by the $\delta^2$ term. Including the "white-noise gain" of the beamformer in the cost function is intended to increase the beamformer robustness in the presence of signal modeling uncertainties (sometimes called perturbations) and numerical correlation between the signal and the noise.

Equation [6] describes Q linear constraints on the admissible solutions to the optimization problem. Here, the KLxQ matrix $\underline{C}$ is the constraint matrix, and the Q-vector $\underline{f}$ is the response vector. The actual design of the linear constraints are discussed below.

A possible solution of the optimization depends on imposing the following two constraints on the window functions $h_i(n)$:

$$\sum_{i=1}^{M}h_i\ (n) = 1$$  [9]

for n=1, 2, . . . , N, and $$h_i(n)h_j(n)=0$$  [10]

for j< >i−1, i, i+1. The first constraint ensures that the filter bank is equivalent to the single filter case if all the local filters ($w_i$) are identical. The second constraint ensures that the windows have compact support.

The optimization problem can be to a large extent decoupled using the second condition(eq. [10]), and the approximation $$\sum_n \sum_i \sum_{j=i-1,i+1} h_i\,(n) h_j(n) \underline{w}_i^T \underline{x}(n) \underline{x}^T(n) \underline{w}_j \approx \qquad [11]$$

$$\sum_n \sum_i \sum_{j=i-1,i+1} h_i\,(n) h_j(n) \underline{w}_i^T \underline{x}(n) \underline{x}^T(n) \underline{w}_i$$

The approximation of equation [11] requires that neighboring filters produce similar results when applied to the same input data in time regions where adjacent windows overlap, instead of requiring that neighboring filters are similar on a point-by-point basis. Thus, the approximation is similar to requiring that the integral of two functions are close, rather than the functions themselves.

With this approximation, the first term of the cost function, $J_1$, becomes $$J_1 = \sum_{i=1}^{M} \underline{w}_i^T \underline{\Phi}_i \underline{w}_i \qquad [12]$$

with $$\underline{\Phi}_i = \sum_n h_i\,(n) \underline{x}(n) x^T(n. \qquad [13]$$

The second term in the cost functional can be rewritten as:

$$J_2 = \sum_{i=1}^{M} \|\underline{w}_i\|^2 tr\left\{\sum_{n=1}^{N} h_i\,(n) \underline{x}(n) \underline{x}^T(n)\right\}, \qquad [14]$$

with "tr" denoting the trace of a matrix.

Combining Equations (5), (12), (14), and reorganizing the terms, the total cost functional can be written as:

$$J = \sum_{i=1}^{M} \underline{w}_i^T \left\{\underline{\Phi}_i + \frac{\delta^2}{KL} tr(\underline{\Phi}_i) \underline{I}\right\} \underline{w}_i, \qquad [15]$$

where I denotes the KL×KL identity matrix. The decoupled optimization problem can be solved for each of the M time windows subject to the constraints [6]. Using the method of Lagrange multipliers, the optimal tap-weight in each window is given by $$\underline{w}_i^* = \underline{\tilde{\Phi}}_i^{-1} \underline{C}\left(\underline{C}^T \underline{\tilde{\Phi}}_i^{-1} \underline{C}\right)^{-1} \underline{f}, \qquad [16]$$

with $$\underline{\tilde{\Phi}}_i = \underline{\Phi}_i + \frac{\delta^2}{KL} tr(\underline{\Phi}_i) \underline{I}, \qquad [17]$$

The second term of the modified local correlation matrix $\Phi_i^-$ can be regarded as a regularization term with $\delta^2$ as the regularization parameter. In array signal processing literature, regularization of correlation matrices with the addition of a scaled identity matrix has been suggested to increase robustness in the presence of perturbations, in the context of narrow-band beamforming. Here, the cost function [5] includes the regularization term from the beginning leading to a generalization for wide-band adaptive beamforming. Hence, the filter response changes as a function of the frequency of the signal.

When the input data to the beamformer is characterized by spatially and temporally uncorrelated (or white) noise, both the correlation matrix $\Phi_i$ and the modified correlation matrix $\mathbf{101}_1^-$ proportional to the identity matrix. In this case, the optimal weight vector becomes $$\underline{w}_i^* = \underline{w}_q = \underline{C}(\underline{C}^T \underline{C})^{-1} \underline{f}. \qquad [18]$$

The weight vector $w_q$ is called the quiescent solution to the optimal beamformer problem, and the corresponding response is known as the quiescent response. Note that the quiescent solution depends entirely on the constraint matrix $\underline{C}$ and the response vector $\underline{f}$.

The optimal weight vector $w_i$ approaches the quiescent weight vector $w_q$ even for general noise fields as the regularization parameter $\delta^2$ is increased. In this case, the modified correlation matrix $\Phi_i^-$ approaches the identity matrix (cf. [17]). The regularization parameter $\delta^2$ therefore weights the optimal solution between a solution that is entirely dependent on the received data, and a solution that is independent of the data. For $\delta^2=1$, both solutions are equally weighted in the sense that their corresponding correlation matrices have equal trace value. In situations where the perturbations are higher, i.e. the assumptions about the seismic acquisition geometry do not exactly hold, finding a beamformer response with a higher level of regularization can give more robust results. Another aspect of the invention relates to the design of linear constraints (eq. [6]) to be imposed on the beamformer.

One type of linear constraint that can be imposed on the beamformer are those designed to preserve seismic signals incident from a target direction, while suppressing interferences incident from other directions. Steering delays $\tau_k$ such as those shown in FIG. 2 define a single "look-direction". Signals incident in this direction are in phase, and for these signals the system can be considered as a single FIR (finite impulse response) filter. The values of the coefficients for this equivalent processor are equal to the sums of the corresponding coefficients in the adaptive processor. Each local beamformer $w_i$ consists of the adaptive filters $w_{i1}, w_{i2}, \ldots, w_{ik}$ processing data from each channel, and a summing unit. The sum of the individual filters $w_{i1}, w_{i2}, \ldots, w_{ik}$ is constrained to give $w_{eq}$, which is the desired response for signals incident in the look-direction, e.g., a unit pulse in the look direction:

$$\sum_{k=1}^{K} \underline{w}_{ik} = \underline{w}_{eq}, \qquad [19]$$

for i=1, . . . , M and $w_{ik}$ being partitioned according to $$w_i = [w_1^T, w_2^T, \ldots, w_k^T]^T. \qquad [20]$$

The linear constraint equations [6] can be rewritten as the matrix equation $$\underline{C}^T w_i = w_{eq} = \underline{f}, \qquad [21]$$

where the KL×L matrix $$\underline{C} = [\underline{I}, \underline{I}, \ldots, \underline{I}]^T, \qquad [22]$$

is the constraint matrix, and $\underline{I}$ is the L×L identity matrix.

For a distortionless response in the look direction, $w_{eq}$ can be chosen as a unit impulse, e.g.

$$w_{eq}=[0, 0, \ldots, 0, 1, 0, \ldots, 0]^T. \quad [23]$$

The quiescent response then becomes that of a fixed-weight beamformer with single equal weights for all elements. In the frequency-wavenumber domain, this corresponds to a sync function that is constant in the f direction. Therefore, for increasing values of the regularization parameter $\delta^2$, the beamformer preserves signals incident not only from the look direction, but also from neighboring directions.

Figure 3:
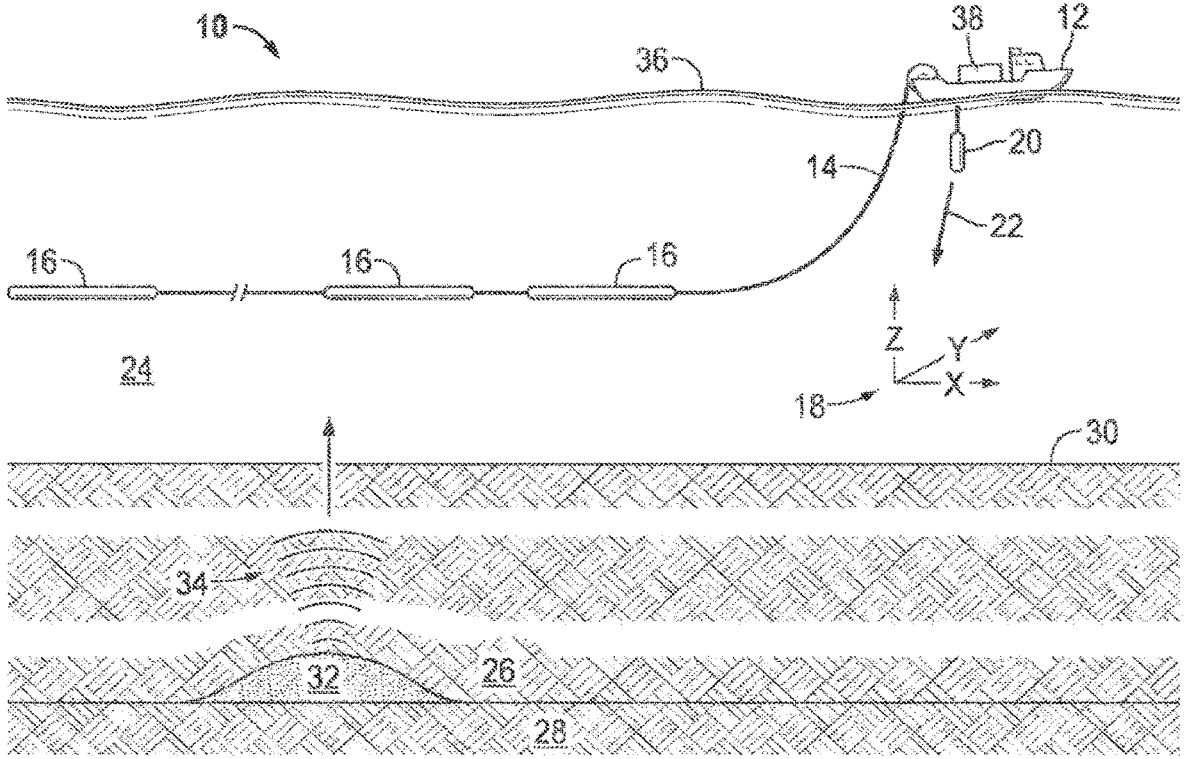
FIG. 3 is a schematic diagram of a marine seismic survey system incorporating multi-component seismic cables and features in accordance to aspects of the disclosure.

Referring now to FIG. 3 a diagram depicting a marine seismic survey system 10 in accordance with embodiments of the disclosure is provided. In the illustrated seismic survey system 10 a survey vessel 12 tows one or more multi-component seismic cables 14 (i.e., seismic streamer) behind the vessel 12. The seismic streamers 14 may be several thousand meters long and may contain various support cables as well as wiring and/or circuitry that may be used to support power and communication along the streamers 14. In general, each streamer 14 includes a primary cable into which is mounted seismic sensor units 16 that record seismic signals. Seismic sensors can include hydrophones, geophones, accelerometers, microelectromechanical system (MEMS) sensors, or any other types of sensors that measure the translational motion (e.g. displacement, velocity, and/or acceleration) of the surface at least in the vertical direction and possibly in one or both horizontal directions. Such sensors are referred to as translational survey sensors, since they measure translational (or vectorial) motion. Each seismic sensor can be a single-component (1C), two-component (2C), or three-component (3C) sensor. A 1C sensor has a sensing element to sense a wavefield along a single direction; a 2C sensor has two sensing elements to sense wavefields along two directions (which can be generally orthogonal to each other, to within design, manufacturing, and/or placement tolerances); and a 3C sensor has three sensing elements to sense wavefields along three directions (which can be generally orthogonal to each other). For the case of multi-component seismic sensors, the sensors are capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 18, for example)) of a particle velocity and one or more components of a particle acceleration.

Depending on the particular embodiment of the disclosure, the seismic sensors may include hydrophones, geophones, particle displacement sensors, particle velocity sensors, accelerometers, pressure gradient sensors, or combinations thereof. For example, in accordance with some embodiments of the disclosure, a particular multi-component seismic sensor arrangement may include a hydrophone for measuring pressure and three orthogonally-aligned accelerometers to measure three corresponding orthogonal components of particle velocity and/or acceleration near the seismic sensor. It is noted that a multi-component seismic sensor assembly may be implemented as a plurality of devices that may be substantially co-located. A particular seismic sensor may include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic survey (i.e., data acquisition) system 10 includes a seismic source 20 that may be formed from one or more seismic source elements, such as air guns, for example, which are connected to the survey vessel 12. Alternatively, in other embodiments of the disclosure, the seismic source 20 may operate independently of the survey vessel 12, in that the seismic source may be coupled to other vessels or buoys, as just a few examples.

As the seismic streamers 14 are towed behind the survey vessel 12, acoustic signals 22 often referred to as "shots," are produced by the seismic source 20 and are directed down through a water column 24 into strata 26 and 28 beneath a water bottom surface 30. The acoustic signals 22 are reflected from the various subterranean geological formations, such as formation 32 depicted in FIG. 3.

In some embodiments, the incident acoustic signals 22 produce corresponding reflected acoustic signals, or pressure waves 34, which are sensed by the seismic sensor units 16. It is noted that the pressure waves that are received and sensed by the seismic sensor units 16 include "up going" pressure waves that propagate to the sensor units 16 without reflection, as well as "down going" pressure waves that are produced by reflections of the pressure waves 34 from an air-water boundary 36.

In some embodiments, the seismic sensor units 16 generate signals (digital signals, for example), called "traces," which indicate the acquired measurements of the pressure wavefield and particle motion (if the sensors are particle motion sensors). The traces are recorded and may be at least partially processed by a signal processing unit 38 that is deployed on the survey vessel 12, in accordance with some embodiments of the disclosure.

In some embodiments, the goal of the seismic acquisition is to build up an image of a survey area for purposes of identifying subterranean geological formations 32. Subsequent analysis of the representation may reveal probable locations of hydrocarbon deposits in subterranean geological formations. Depending on the particular embodiment of the disclosure, portions of the analysis of the representation may be performed on the seismic survey vessel 12, such as by the signal processing unit 38.

In some embodiments, a configuration of a marine seismic cable can include a long tubular shaped body. The body can include an outer skin that encloses one or more strength members, seismic sensors, spacers to support the skin, a filler material and electrical wiring that transmits power and information between various components (e.g., processors and sensors). In general, the filler material typically has a density to make the overall streamer neutrally buoyant.

In marine seismic cables the inner workings of the cable are supported in various ways. It should be appreciated that the support structures inside the streamer contribute to the measurement ability of the sensors since the sensors are very sensitive and noise is a significant consideration and issue. A structure may adequately support the sensors and associated wiring, yet introduce an unacceptable amount of noise to the readings. Conversely, a support structure may be acceptable with regard to noise and other signal detection aspects, but not adequately provide structural support. Further, a sensor may be properly supported and provide adequate noise attributes, but the cost of the hardware may be too expensive to be commercially viable. Fine points of the support structure of a seismic streamer can provide magnified affect with respect to the performance of the sensors in the streamer as well as the cost of the product.

Figure 4:
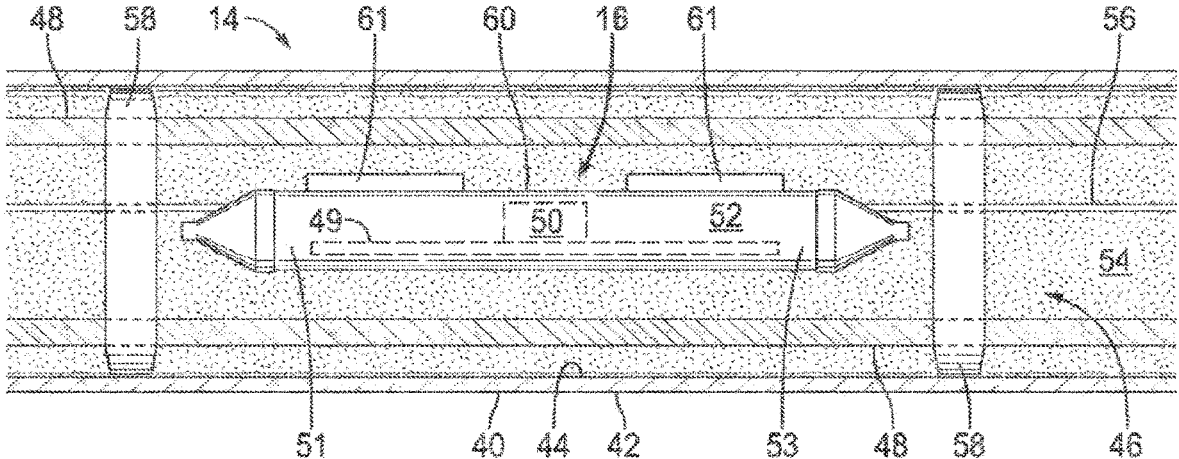
FIG. 4 illustrates a portion of seismic streamer disposing a decoupled floating seismic sensor unit according to one or more aspects of the disclosure.
Figure 5:
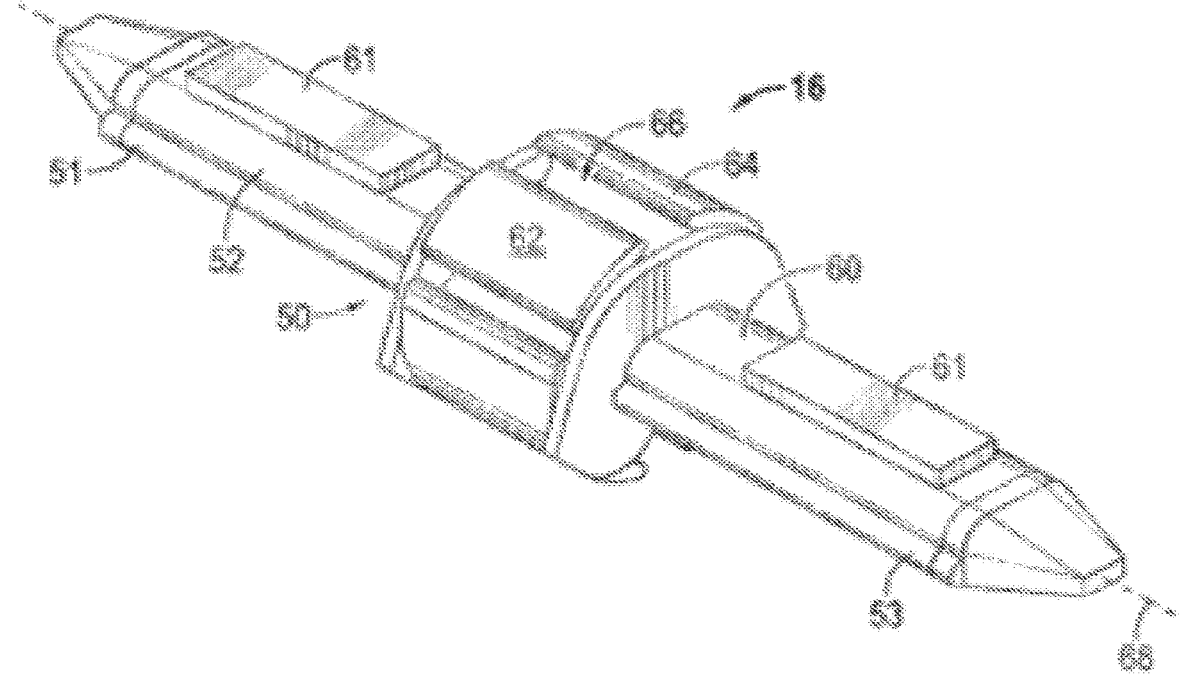
FIG. 5 illustrates a non-limiting example of a seismic sensor unit disposed with a sensor spacer device according to one or more aspects of the disclosure.

FIG. 4 illustrates a portion of a seismic streamer cable 14 that carries a sensor unit 16 according to aspects of the disclosure that is decoupled and "floating" in the streamer. The streamer 14 includes an outer skin 40 that defines an outer surface 42 and an inner surface 44, the outer skin being formed in a longitudinally extending tubular shape. The inner surface 44 of the outer skin 40 defines an internal volume 46. At least one strength member 48 (e.g., KEV-LAR, a registered trademark of DuPont) extends longitudinally through the internal volume 46 for example in a direction parallel to that of the longitudinally extending tubular shape. In FIG. 4 a pair of spaced apart strength members 48 extend longitudinally within the internal volume 46. For example, the strength members 48 may be spaced apart and located about 180 degrees from one another. A sensor unit 16 in accordance with aspects of the disclosure is disposed in the internal volume 46. The internal volume 46 is filled with a filler material 54 to support the sensor unit and the outer skin and other components such as electrical wires 56. The filler material 54 may be a gas, liquid, gel, or foam that may provide sensing performance attributes as well as support the inner hardware within the outer skin. The filler material (e.g., gel or foam) may serve to reduce coupling (decouple) of the accelerometers to the streamer skin and/or the strength members. It should be noted that various gel or foam materials are well known and can be commercially purchased. In the depicted example, spacers 58 are also disposed in the internal volume to support the outer skin. Non-limiting examples of spacers 58 are described for example in U.S. Patent publication Nos. 2009/0323468, 2011/0273957 and 2018/0136348, the teachings of which are incorporated by reference.

In some embodiments, the depicted sensor unit 16 includes a sensor 50, e.g. accelerometer, and sensor electronics 49 disposed in and carried by a longitudinal extending sensor housing 52. A seismic sensor 50 may include at least one microelectromechanical system (MEMS) based sensor accelerometer, which may be advantageous due to its size, low power dissipation and low cost. The sensor housing 52 includes a first end 51 and a second end 53 longitudinally separated from one another. In accordance to an embodiment the sensor housing 52 is greater than about 100 mm in length. In accordance with an embodiment the sensor housing is greater than about 150 mm. In accordance with an embodiment the sensor housing extends in the longitudinal direction about 200 mm or longer. The sensor can be a gradient sensor when configured in this manner. The accelerometer may be a two axis or a three axis accelerometer. The longitudinal sensor housing may be constructed for example of a metal or a polymer. The cross-section of the sensor housing 52 may be circular or non-circular. The longitudinal sensor housing 52 may have an outer planar surface 60 for example on which floatation or buoyancy elements 61 may be attached. For example, in FIG. 4 the sensor unit 16 with the buoyancy elements 61 may be substantially neutrally buoyant in the filler material 54. By making the sensor unit 16 neutrally buoyant relative to the filler material (e.g., the sensor unit and filler having the same density), the sensor 50 is coupled with the filler 54. This may be desired for example when the sensor is decoupled from the mechanical strength member. In some embodiments the sensor unit 16 may not include the buoyancy elements 61. It should be recognized that the sensor 50, i.e., sensor unit 16, mounting configuration may be selected in combination with the selection of the filler 54 material, the outer skin 40 material, and the material of strength member 48 as these components affect the noise characteristics.

Referring now to FIGS. 5-9, embodiments of sensors units 16 are illustrated including a longitudinal sensor housing 52 disposing a sensor co-located with a spacer device 62 such that the sensor housing 52 extends through the center and from opposite sides of the spacer device 62. The sensor housing 52 may be arranged such that it extends substantially equal distances from the opposite sides of the space device (i.e. symmetrical). The sensor housing 52 may be an integral portion of the spacer device 62 or may be a separate, individual element. The sensor housing 52 may be acoustically coupled, see e.g., FIGS. 6 and 7, or decoupled, see e.g., FIG. 8, from the sensor spacer device 62 and the seismic cable.

In some embodiments, the sensor spacer device 62 has circular profile such that when positioned within the internal volume of the outer skin 40 the outer surface 64 (i.e., outer radius) is substantially similar to the inner surface 44 (i.e., inner radius) of the skin 40. In the illustrated example the outer radius 64 of the sensor spacer device 62 has portions generally designated 65 (FIG. 6), and specifically designated 65-1, 65-2 etc. that are radially separated from each other to contact the inner radius 44 (FIG. 7) to support the sensor spacer device within the skin 40. Opposing portions 65 are radially separated from one another for example between about 120 and 180 degrees. For example, with reference to FIG. 6 the outer radius portions 65-1 are separated from one another between about 120 and 180 degrees and the outer radius portions 65-2 are separated from one another between about 120 and 180 degrees. The sensor spacer device 62 includes longitudinally extending channels 66 or grooves that may be open along the outer radius 64 to the inner surface of the outer skin. The channels 66 define a longitudinally extending passage through which the strength member(s) 48 and internal components, such as wiring 56 can pass. The sensor spacer device 62 can have integrated thereto, or fit therewith the sensor housing 52 that extends from opposite sides of the sensor spacer device 62 and carries therein the seismic sensor 50, e.g., MEMS accelerometer. The sensor housing 52 may extend for example coaxial with the central longitudinal axis 68 (FIG. 5) of the sensor spacer device 62. The sensor spacer device 62 is not limited to the configurations illustrated in FIGS. 5-9.

Figure 6:
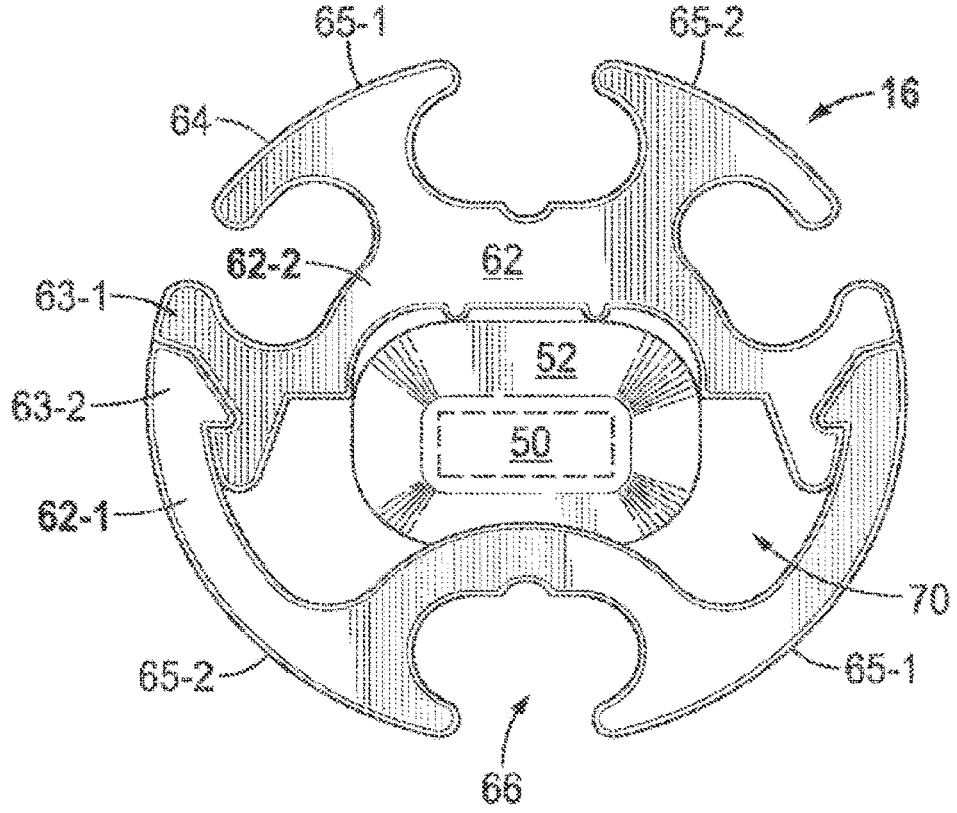
FIG. 6 is an end view along a longitudinal axis of seismic sensor unit disposed with and coupled to a sensor spacer device according to one or more aspects of the disclosure.
Figure 7:
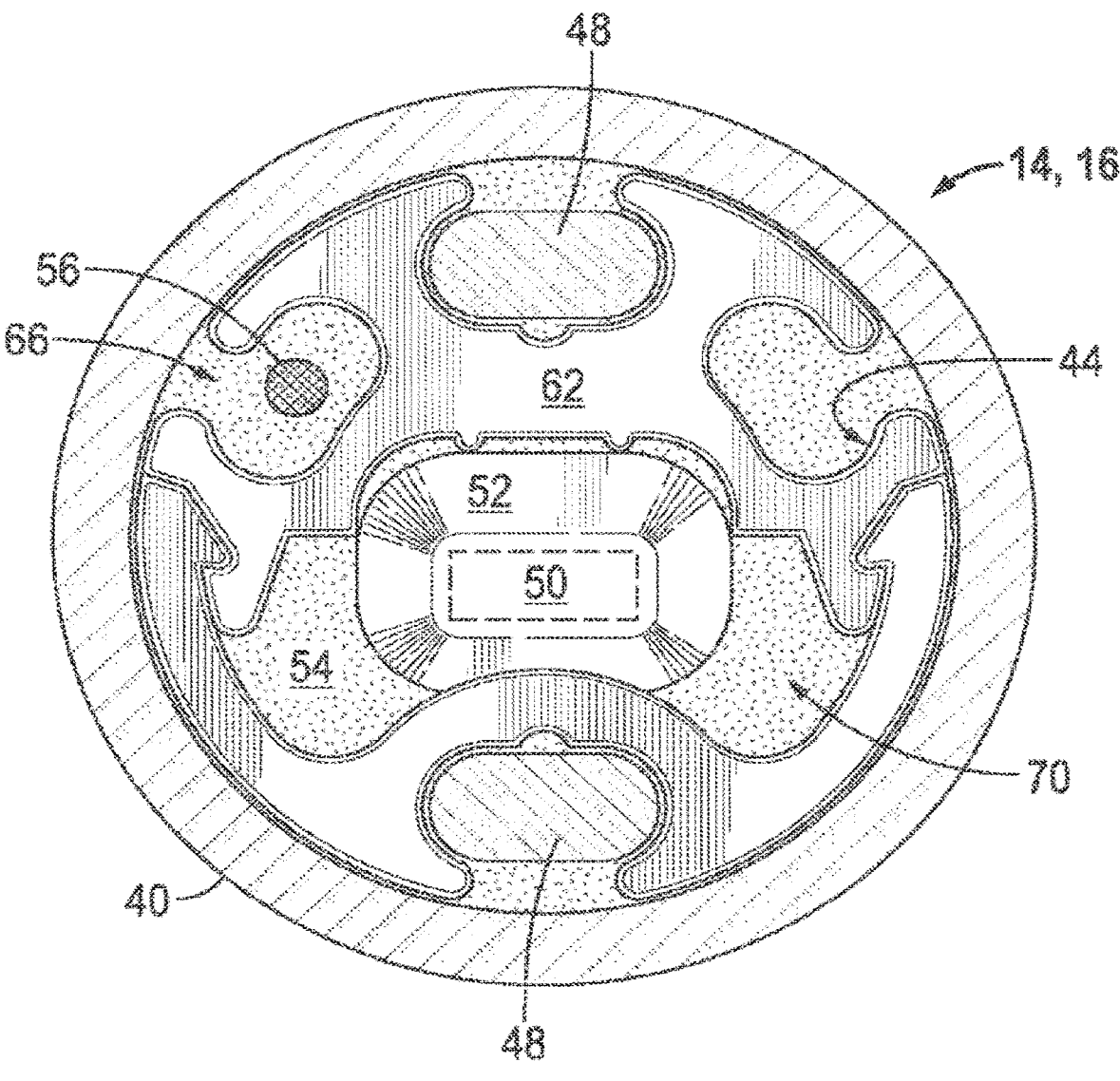
FIG. 7 is an end view along a longitudinal axis of seismic cable having an internal seismic sensor unit disposed with and coupled to a sensor spacer device and the cable strength members according to one or more aspects of the disclosure.
Figure 8:
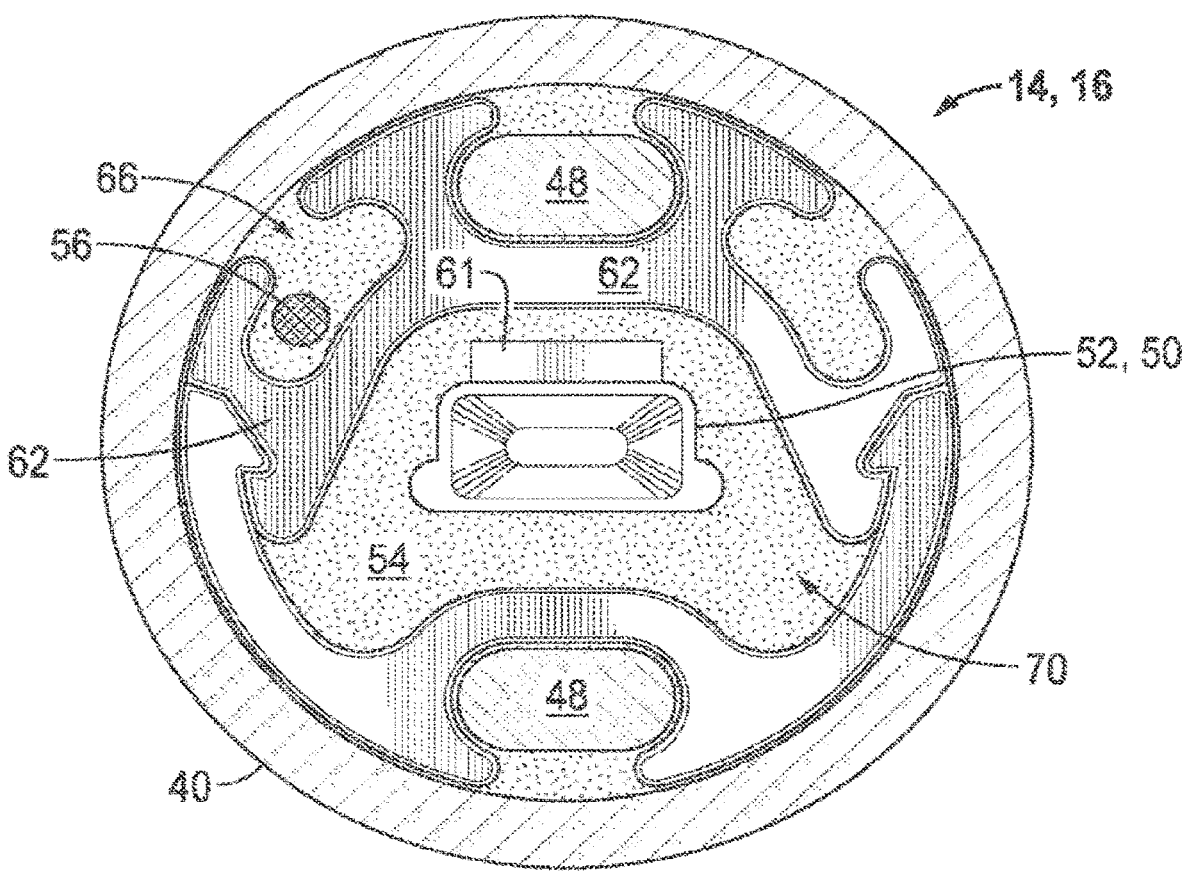
FIG. 8 is an end view along a longitudinal axis of seismic cable having an internal seismic sensor unit disposed with and decoupled from a sensor spacer device and the cable strength members according to one or more aspects of the disclosure.

In some embodiments, for example as illustrated in FIGS. 6-8, the sensor housing 52 may be positioned through a central passage 70 extending longitudinally through the sensor spacer device 62 along the longitudinal axis. When the sensor housing and the spacer device are separate parts and the sensor housing extends through the central passage or opening in the spacer device, the sensor housing can be in a generally non-circular shape to match a non-circular shaped central passage 70 so as to prevent rotation of the sensor housing within the central passage 70. In the examples illustrated in FIGS. 6-8, the sensor spacer device 62 is formed in two sections, 62-1 and 62-2 which are connected together at corresponding latch ends 63-1 and 63-2. In some embodiments the spacer device is constructed as a single component and in some embodiment the spacer device may be constructed of more than two sections. The sensor spacer device is not limited to the illustrated configurations.

In some embodiments, it should be appreciated that the MEMS sensors can be 1C, 2C or 3C sensors depending on the desired measurements. The MEMS sensors can have axes at right angles to one another or at other configurations. One way to orient the accelerometers is with an axis facing perpendicular to a surface of the sensor housing, with an axis facing in line with the streamer cable, and with another axis at a right angle to axis in line with the streamer and the axis facing perpendicular to the surface.

FIGS. 6 and 7 are longitudinal end views of an example of the sensing unit 16 in which the sensor housing 52 and the carried sensors are coupled to the sensor spacer device 62. In FIG. 7 the sensor housing 52 and carried sensors are anchored to a mechanical backbone, i.e., strength members 48, of the streamer cable 14 via the spacer device 62. The sensor housing 52 is in physical contact and engaged by the opposing sections or sides of the sensor support device 62 thereby rigidly connecting the sensor housing 52 and accelerometer with the sensor support device. In FIG. 7 two strength members 48 extend through the inside of the streamer 14 and through channels 66 (FIG. 6) defined by the sensor spacer device 62. The connection between the sensor spacer device 62 and the strength members 48 is a tight connection thereby anchoring the sensor spacer device to the strength members and rigidly connecting the sensor 50 in the FIG. 7 embodiment to the movement or vibrations of the strength member. This configuration also connects (couples) the movements of the streamer skin 40 to the sensor 50. Inside the streamer 14 a filler material 54 such as a gel can surround the device, thus contributing positively to the support aspects of this design, as well as the sensing performance. Though gel can be used, it should be appreciated that other materials can be used.

Referring now to FIG. 8, a longitudinal end view of a streamer 14 illustrating a sensing unit 16 wherein the sensor housing 52 and sensor 50 are co-located with a spacer device 62 and decoupled from the spacer device and the seismic cable 14 for example by way of a shock absorbing material such as decoupling foam 54. Different types of filler material 54 can be utilized in different sections of the streamer cable. The sensor housing 52 extends through the central passage 70 of the spacer device 62, but is not in direct physical contact with the spacer device but is positioned within a foam 54 disposed in the central passage 70. In the illustrated example, buoyancy elements 61 are attached to the sensor housing 52 to provide neutral buoyancy to the sensor housing 52. Using buoyancy elements 61 and or selecting a filling material such that the sensor unit is neutrally buoyant couples the sensor 50 to the surrounding filler material.

In FIGS. 7 and 8, the sensor 50 may be substantially centered on the longitudinal axis of the streamer 14; however, the sensor 50 may be positioned off-center. An off-center sensor 50 will be more susceptible to receiving some form of noise and by recording this noise intentionally and more clearly (e.g., noise shaping) it may more easily be filtered.

Figure 9:
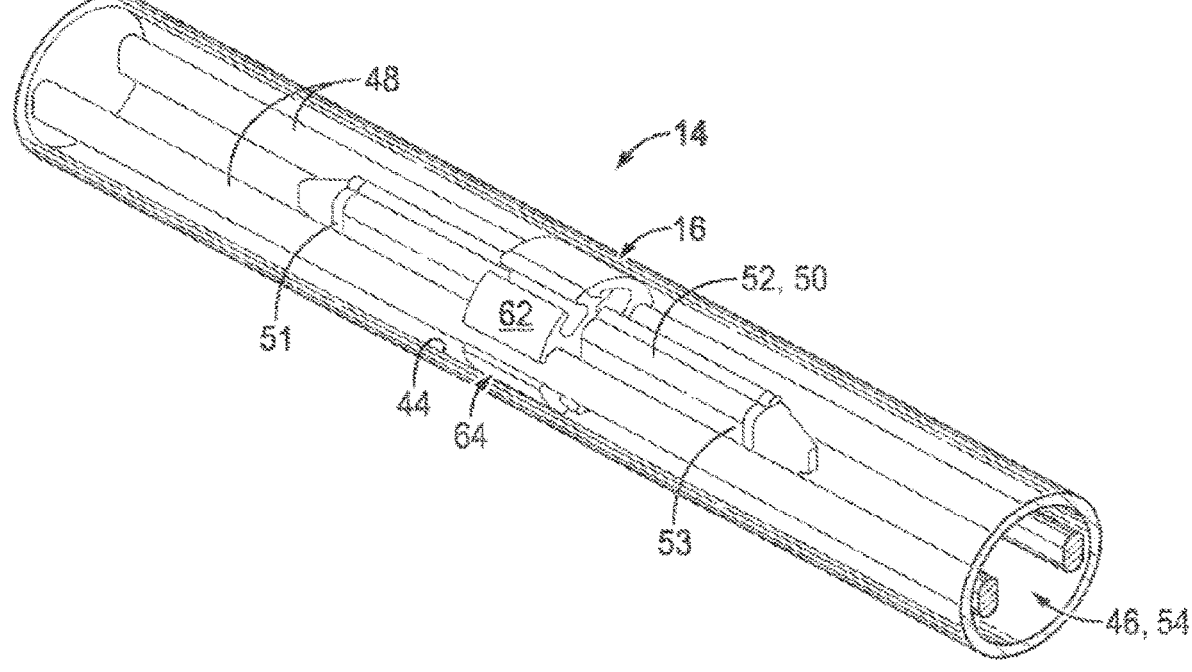
FIG. 9 illustrates a portion of a seismic streamer incorporating a seismic sensor unit that is disposed with a sensor spacer device according to one or more aspects of the disclosure.

FIG. 9 illustrates a portion of a seismic cable 14 incorporating a sensor unit 16 in accordance with an embodiment of the disclosure. With additional reference to FIGS. 5-8, a sensor spacing device 62 is disposed in the internal volume 46 of the skin 40 with the outer radius 64 proximate to or in contact with the inner radius 44 of the skin. The longitudinal sensor housing 52 carrying the sensor 50 extends through the center passage 70 of the sensor support device 62. At least one and in FIG. 8 two spaced apart strength members 48 extend through the longitudinal internal volume 46 of the outer skin 40 and through channels 66 of the sensor spacing device 62. The sensor housing 52 and sensor 50 may be coupled or decoupled from the sensor support device 62 and strength members 48. The internal volume may include a filler material 54, such as a gas, liquid, gel or foam.

It should be appreciated that the different sensor unit configurations (e.g., decoupled and floating, decoupled and co-located with a spacer device, and coupled to a co-located spacer device) can be used within the same streamer cable, or even the same streamer cable section, depending on the operational needs. While the various figures show individual sensor units in the streamer, each streamer section may include two or more sensor units which may be uniformly or non-uniformly spaced along the cable.

It should be appreciated that noise is an issue in any seismic survey. Noise can be removed in the processing of the data by various techniques, but can also be controlled (e.g., shaped) by choosing particular sensor mounting designs. This can be illustrated by explaining that in practice a single streamer section can have many (sometimes many hundreds of) individual sensors. A large number of sensors help provide data that can more easily be processed to remove noise. The large number of sensors required to filter the noise impacts negatively the cost of the streamer. Each extra sensor in the spread increases the cost of the system due to the cost of the sensor and its packaging, the cost of the power and communication overhead (i.e. other components required to feed the sensor with power and record its data) and the cost of processing the data from this extra sensor. If the sensors were shielded from the noise, fewer sensors could be used with acceptable results. Described herein are designs that aid in reducing the level of the noise (e.g., decoupling) and shaping the noise sensed or received so that the noise characteristics are easier to filter at later processing stages.

Referring now to FIGS. 10-13, embodiments of the present disclosure directed towards a compressive sensing marine streamer system are provided. It should be noted that any of the embodiments described below may be used in conjunction, either in whole or in part, with some or all of the embodiments provided in FIGS. 1-9. More particularly these embodiments are directed towards marine towed streamer seismic exploration using towed marine streamers having one or more sensors (e.g., micro-electro-mechanical sensors ("MEMS")) apportioned at an advantageous spacing.

For example, and referring again to FIGS. 3-4, each streamer 14 may include a primary cable into which is mounted seismic sensor units 16 that record seismic signals. Seismic sensors can include particle motion sensors, hydrophones, geophones, accelerometers, microelectromechanical system (MEMS) sensors, or any other types of sensors that measure the translational motion (e.g. displacement, velocity, and/or acceleration) of the surface at least in the vertical direction and possibly in one or both horizontal directions. Specific arrangements and spacings of sensors are discussed in further detail hereinbelow.

Embodiments included herein may utilize, at least in part, single-sensor Q-Marine and multi-measurement IsoMetrix technologies (available from the Assignee of the present disclosure), while reducing cost through the application of compressive sensing theory. By introducing acceleration sensors and optimized gel rheology to the field-proven Q-Marine platform, embodiments included herein will deliver quality seismic data at a low cost.

As discussed above, in some embodiments compressive sensing theory techniques may be employed, which enables the generation of 3D deghosted data using fewer sensors, thus reducing cost. To enable the layout to work with standard processing workflows, embodiments included herein may utilize a bespoke coherent signal and noise regression (CSNR) method to regularize and noise attenuate data recorded by the non-uniformly sampled accelerometers.

In some embodiments, the present disclosure may utilize, in whole or in part, compressive sensing systems, some of which may include, but are not limited to, the IsoMetrix CS systems from the Assignee of the present disclosure.

In some embodiments, the compressive sensing techniques included herein may build upon prior platforms and further introduce compressive sensing technology in a gel platform for efficient low-cost design. By combining state-of-the-art accelerometer measurements with the robust and cost-efficient solid gel platform, the new compressive sensing streamer delivers the highest quality seismic data at low cost.

In some embodiments, and as discussed below in further detail, the compressive sensing systems included herein may use accelerometer technology where particle motion is measured in three orthogonal directions to deliver acceleration along the Y and Z streamer axis. Additionally and/or alternatively, this accelerometer technology may be coupled with hydrophones as discussed above. This may help to deliver a measure of the pressure wavefield and its derivatives to allow accurate 3D receiver side deghosting of the wavefield and filling of the receiver ghost notches, therefore providing true multi-measurement broadband data.

In some embodiments, and in order to achieve high data quality even in challenging towing environments, the accelerometer configuration and the gel rheology (e.g., the physical properties of the gel) may be a core element of the new platform design. By capitalizing on single-sensor technology and using a gel with adequate rheology, according to designs and embodiments of the present disclosure, it is possible to shape the noise propagation characteristics to reduce noise.

Figure 10:
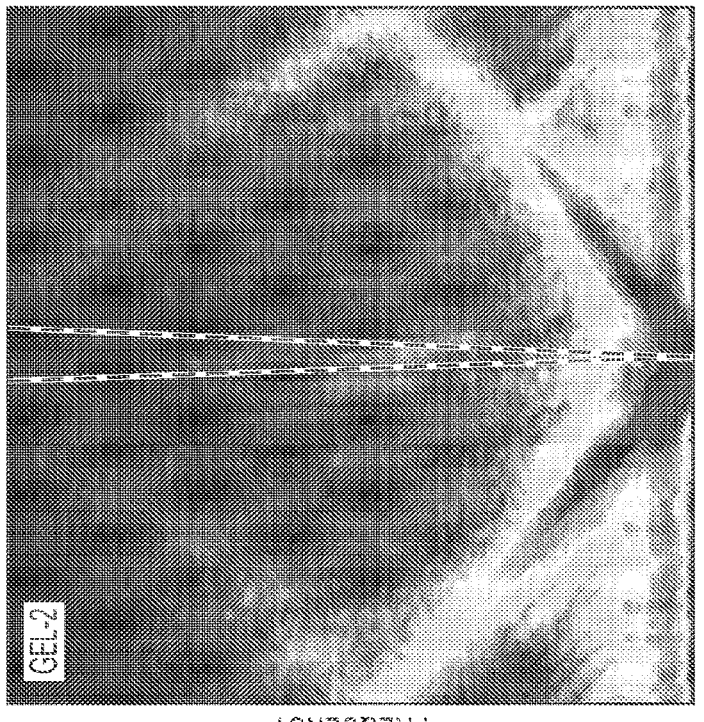
FIG. 10 illustrates two plots that depict streamer platform noise propagation characteristics influenced by gel rheology.
Figure 10:
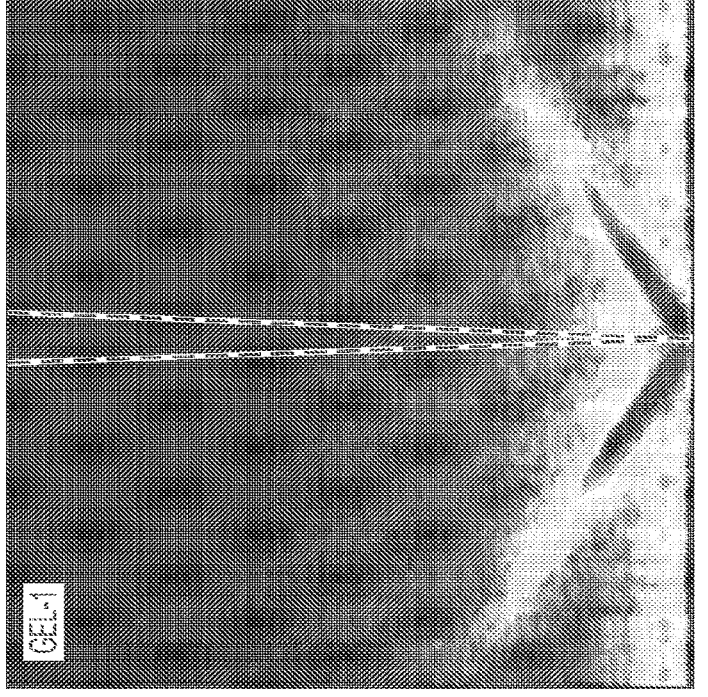

FIG. 10, for example, shows how gel can deliver acceptable noise on the particle motion sensor. More specifically, this diagram shows how streamer platform noise propagation characteristics may be influenced by gel rheology. The plot on the left exhibits one level of noise attenuation even at low frequency while the plot on the right shows noise energy up to high frequency.

In some embodiments, to get the full benefit of the multi-sensor streamers, high quality particle motion measurement may be needed. This may be a challenge due to the extreme sensitivity of particle motion sensors to the streamer-borne vibrations. For example, towing a long streamer under axial tension inevitably generates vibrations. These vibrations may have much smaller wavelengths than the seismic signal and they may travel large distances along the streamer before getting attenuated. The amplitude of the vibrations can be several orders of magnitude stronger than the signal of interest. Example vibrations may generally include torsional vibrations which may be caused by rotational movement of the cable as a function of time, longitudinal vibrations which may be caused by the compression and elongation of the streamer, and transverse vibrations which may be caused by the dynamic bending of the streamer. As will be discussed in greater detail below, it has been observed that maximum wavenumber in the data (i.e., acoustic signal, torsional vibrations, longitudinal vibrations, and transverse vibrations) received from a plurality of particle motion sensors, the maximum wavenumber in the data corresponds to the maximum wavenumber of the transverse vibration noise.

Classical Nyquist sampling theory dictates a uniform sensor distribution with at least two single-sensor measurements per shortest wavelength acquired, whether that wavelength is associated with signal or noise. This uniform distribution may generally be referred to as the Nyquist interval, meaning the maximum uniform interval (distance between) sensors possible while ensuring unaliased measurements. Not exceeding the 3.125 meter uniform hydrophone spacing in the single sensor streamer described above may ensure unaliased broadband pressure measurements of the total wavefield, covering both signal and noise. This facilitates subsequent digital preconditioning and noise attenuation of the raw measurements, without coarse spatial sampling, as is the situation with analog groups.

In some embodiments, and referring also to FIGS. 11-14, the seismic streamer system described herein may utilize purpose-built 3-axial MEMS accelerometers to measure the particle acceleration of the acoustic wave, which may be a proxy for the spatial pressure gradient. This highly accurate, low noise, low power, miniature accelerometer may have a stable flat frequency response from DC to several kHz. Its 130 dB dynamic range, with excellent vector fidelity, may capture everything from the low magnitude crossline pressure gradient of subsurface reflections to the high magnitude vibration noise of the cable. Furthermore, the DC measurements enable rotation to the gravity vector.

However, while the maximum 3.125 m uniform hydrophone spacing captures noise components for the pressure measurements, the slowly propagating vibration noise may require a Nyquist spacing of a few tens of centimeters. A ten-fold higher sampling density for accelerometers would make the streamer prohibitively expensive and complicated. Accordingly, embodiments included herein provide for an accelerometer layout according to the principles of compressive sensing theory, thereby allowing for far fewer accelerometers than would otherwise be required by classical Nyquist theory.

The concept of compressive sensing, as used herein, is based on the fact that real measurements tend to have structure; they are rarely of bandlimited white noise with random phase, for which classical Nyquist sampling is designed. The data recovery algorithms in compressive sensing instead assume that the structure in the data has a sparse representation. In terms of streamer vibration noise, this is indeed the case. For example, the cable may not experience all possible vibration move-out velocities around each sensor simultaneously; instead, it experiences a few distinct noise modes locally.

Accordingly, and referring again to FIGS. 11-14, a hybrid strategy may be used to optimize the non-uniform accelerometer layout. Generally, the sensor spacing for the classical sampling theorem depends on the largest wavenumber present in the data known as the Nyquist wavenumber. As will be discussed in greater detail below, the sampling spacing may be dependent on the effective wavenumber width of the acoustic signal and the transverse vibration noise by non-uniform sampling. As discussed above, when the sensor spacing is constrained to be uniform, the number of sensors required to record unaliased noise may become large and therefore prohibitive. In its simplest form, Nyquist-Shannon sampling theorem requires a sampling rate that is larger than the Nyquist rate, i.e., twice the maximum wavenumber in the data. As such, the sensor spacing for uniform sampling cannot be larger than the inverse of the double-sided wavenumber-width. In some implementations, the maximum wavenumber of the data may be the maximum wavenumber of the transverse vibration noise. As discussed above, this may generally be referred to as the Nyquist interval. From an acoustic signal perspective, for a maximum frequency of e.g., 150 Hz and a minimum apparent velocity of e.g., 1500 m/s for a horizontally propagating acoustic signal in the inline direction, the double-sided wavenumber-width of the signal is $0.2 \text{ m}^{-1}$. This means that the sensor spacing should not be larger than 5 meters at uniform sampling to record everything within the signal cone unaliased. The sensor spacing can be larger if sparsity of the acoustic signal is assumed or if portions of the acoustic signal with slow apparent velocities are sacrificed. From the noise perspective, the sampling spacing should be chosen according to the phase velocity of the slowest noise mode. Among transverse vibrational noise, longitudinal vibrational noise, and torsional vibrational noise, the transverse noise has the slowest apparent velocity. In some embodiments, the double-sided wavenumber-width of the transverse vibration noise may require a sensor spacing of e.g., 0.625 meters for solid marine seismic sensors and e.g., 0.3676 meters for gel-filled marine seismic sensors. In this manner, even when some aliasing is allowed, the number of sensors required for a gel-filled streamer may be e.g., 272 sensors for a 100 meter section and/or e.g., 160 sensors for a 100 meter section of solid marine seismic streamers.

In some embodiments, a non-uniform layout may include spacing a plurality of MEMS sensors based upon, at least in part, an effective wavenumber-width of the acoustic signal and a transverse vibration noise. As discussed above, it has been observed that the maximum wavenumber in the data (i.e., acoustic signal, transverse vibrations, torsional vibrations, and longitudinal vibrations) corresponds to the maximum wavenumber of the transverse vibration noise. In some embodiments, the effective wavenumber-width may be determined from the Gabor wavenumber-width. For example, the Gabor wavenumber-width W of a signal $s(x)$ with Fourier transform $\hat{s}(k)$ may be defined as the square-root of the second order moment of its spectrum normalized by the zeroth-order moment as shown below in Equation 24:

$$K = \sqrt{M_2/M_0} \tag{24}$$

where the n-th order moment is defined as shown below in Equation 25:

$$M_n = \int_{-\infty}^{\infty} k^n |\hat{s}(k)|^2 dk \tag{25}$$

In some embodiments, the zeroth order moment may correspond to the average power, and the second order moment may be a measure of the spread of the spectrum. The definition of Gabor wavenumber-width is useful especially for a mono component signal with a low-pass spectrum which is localized around the zero wavenumber. For example, when the signal is multi component and the individual components have band-pass spectra, then the Gabor wavenumber-width overestimates the actual spread of the signal spectra. In some embodiments, the effective wavenumber-width $K_{i,E}$ of a mono component signal as the Gabor wavenumber-width computed about its center of mass $k_i$ as shown in Equation 26:

$$K_{i,E} = \frac{\sqrt{\int_{-k_i}^{k_i} (k - k_i)^2 |\hat{s}(k)|^2 \ dk}}{\sqrt{\int_{-k_i}^{k_i} |\hat{s}(k)|^2 \ dk}} \tag{26}$$

where the range of the integration may cover the energy of the signal component i.

Intrinsically, it may be assumed that the spectra of different components occupy disjoint bands in wavenumber. In some embodiments, the center of mass $k_i$ may be estimated from the data. In some embodiments, the effective wavenumber-width of a multi component signal may be defined as the sum of the effective wavenumber-widths of the individual components as shown below in Equation 27:

$$K_E = \Sigma_i^\infty K_{i,E} \tag{27}$$

In some embodiments, when the data consists of an acoustic signal and transverse vibration noise, the effective wavenumber-width may be the sum of the width of the acoustic signal (e.g., a signal cone) and the effective wavenumber-widths of the transverse vibration noises propagating in the +x and the −x directions. In some embodiments and for a wide range of frequencies, the estimated effective wavenumber-width for transverse vibration noise may be approximately $0.03 \text{ m}^{-1}$ and when considering negative wavenumbers, the effective wavenumber-width for transverse vibration noise may be approximately $0.06 \text{ m}^{-1}$. In some embodiments, the sampling spacing may be dependent on the effective wavenumber width of the acoustic signal and the transverse vibration noise instead of being dependent on the double-sided wavenumber-width of the Nyquist-Shannon sampling.

In some embodiments, the sampling spacing may be increased by being dependent upon the effective wavenumber-width of the acoustic signal and the transverse vibration noise by non-uniform sampling. For example, consider a signal, $s(x)$ with a Fourier transform $\hat{s}(k)$ as shown in Equation 28:

$$s(x) = \int_{-\infty}^{\infty} e^{j2\pi k}\hat{s}(k)dk \tag{28}$$

In some embodiments, the Poisson sum formula may link the periodic summation of the signal $s(x)$ to the samples of its Fourier transform $\hat{s}(k)$ as shown in Equation 29:

$$\sum_{m=-\infty}^{\infty} s(x + m^c) = \frac{1}{c} \sum_{p=-\infty}^{\infty} e^{j\frac{2pxp}{c}}\hat{s}\left(\frac{p}{c}\right) \tag{29}$$

where c>0 is the period of the summation. In some embodiments, Equation 29 may be valid regardless of the space and wavenumber of the signal $s(x)$.

In some embodiments, it may be assumed that the signal $s(x)$ has been tapered in space to have its amplitude smoothly roll down to zero at the boundary of the observation interval [−c/2, c/2]. It may be assumed that most of the energy in the wavenumber domain is restricted to an interval [−K/2, K/2], where K is the effective double-sided wavenumber-width. As such, the infinite summation of Equation 29 becomes finite and the Poisson sum formula may simplify to Equation 30:

$$s(x) @ \frac{1}{c} \sum_{p=-P/2}^{P/2-1} e^{j\frac{2pxp}{c}}\hat{s}\left(\frac{p}{c}\right), \ -\frac{c}{2} \pounds x < \frac{c}{2} \tag{30}$$

where the integer EEE is the space-wavenumber-width product. Although Equation 30 assumes an even EEE, the only modification for an odd EEE would be to change the range of summation to −(P−1)/2 to (P−1)/2.

In some embodiments, Equation 30 may define the continuous domain signal $s(x)$ over the interval [−c/2, c/2]. The matrix notation may represent the samples of the continuous domain signal on a discrete receiver array as $x = [x_1, K, x_M]^T$ and as shown in Equation 31:

$$s(x) = F(x, k)\hat{s}(k) \tag{31}$$

where S may be the M-dimensional vector of measurements, $F=P^{-1/2}\exp(j2\pi xk^T)$ is the M×P dimensional Fourier matrix, and ŝ is the P dimensional vector of Fourier coefficients.

In some embodiments, the Fourier coefficients may be computed over a uniform wavenumber grid with $k_p=p/X$, and $k$ is the vector of wavenumbers. So far it has only been assumed that s is tapered in space and approximately wavenumber limited to K/2. Now suppose that, s is also sparse in wavenumber. In other words, some of the coefficients of the P dimensional Fourier coefficient vector are practically zero. If the number of non-zero Fourier coefficients with N<P, and the corresponding wavenumbers are represented with $k'\in \mathbb{R}^N$, then Equation 31 is equivalent to Equation 32:

$$s(x)=F(x, k')s(k') \qquad [32]$$

Since the wavenumber coordinates may be equally spaced with $\Delta k=1/X$, the effective wavenumber-width of a signal with N non-zero Fourier coefficients is $K_E=N/X$. In some embodiments, the linear transformation defined by Equation 32 may map the N-dimensional vector of Fourier coefficients to the M-dimensional vector of measurement. The transformation is injective or one-to-one if different Fourier coefficient vectors are mapped to different measurement vectors. Notationally, if $s_1(k')\neq s_2(k')$ then $s_1(x)\neq s_2(x)$. Equivalently, if $s_1(x)=s_2(x)$ then $s_1(k')=s_2(k')$. An injective transformation is desirable because then there exists an operation that can recover ŝ(k') uniquely from a given s(x). After recovery of ŝ(k'), it is possible to compute the continuous domain signal anywhere within its domain [−X/2, X/2] by using the Poisson sum formula as shown in Equation 29.

Conversely, a non-injective transformation may map several Fourier coefficient vectors to the same measurement. Notationally, $s_1(k')\neq s_2(k')$ may result in $s_1(x)=s_2(x)$. In signal processing, this phenomenon is called aliasing. In other words, two distinct continuous-domain signals are indistinguishable when sampled on the receiver array x. Consequently, the measurement alone is insufficient to recover the data unless some other prior information is available.

A classical theorem from linear algebra is that the linear transformation of Equation 32 associated with a receiver array x and a wavenumber support k' is injective if and only if the columns of the sampled Fourier matrix F(x, k') are linearly independent. A necessary condition for linear independence is that F(x, k') should have more columns than rows. Consequently, a necessary condition to avoid aliasing is shown below in Equation 33:

$$M\geq N=XK_E \qquad [33]$$

Since $\Delta x_{av}=X/M$ is the average receiver spacing for Mreceivers over the interval [−X/2, X/2], the necessary condition to avoid aliasing can also be written as shown below in Equation 34:

$$\Delta x_{ave}\leq 1/K_E \qquad [34]$$

In some embodiments, this inequality of Equation 34 may provide an upper bound on the average sensor spacing. In contrast, the sensor spacing requirement under the uniform sampling constraint depends on the double-sided wavenumber-width as shown below in Equation 35:

$$\Delta x_u\leq 1/(2K) \qquad [35]$$

Combining Equations 34 and 35, the average sensor spacing for unaliased sampling should satisfy $1/(2K) \leq \Delta x_{ave}\leq 1/K_E$. In the worst case, when the data is not sparse the average sensor spacing is 1/(2K) as specified by the Nyquist-Shannon's interpolation theorem. However, for the case of transverse vibrations it could be possible to acquire unaliased signal with an average sensor spacing close to $1/K_E$ which is larger than 1/(2K). To achieve this benefit, the continuous domain signal may need to be recovered from its non-uniform samples.

In some embodiments, the inputs to the Coherent Signal and Noise Regression (CSNR) algorithm may include the samples of the data at known receiver locations, the statistics of the unknown quantities and the spectral support of the coherent signal that comprises both acoustic signal and the vibration noise. A distinct feature of the CSNR algorithm, is the explicit use of the probabilistic priors for the amplitude vector which is completely different than the spectra based priors used in earlier trace interpolation algorithms. As will be discussed in greater detail below and by using the Bayesian estimation framework, the maximum a posteriori estimate of the amplitude vector may be derived given a set of basis vectors. For example, the choice of priors may result in different interpolation methods such as convex relaxation in compressed sensing, or regularized least-squares regression. While the previously proposed spectra-based constraints reduce the number of interpolation parameters, the probability density priors stabilize the interpolator by acting as additional measurement. Regarding the samples of data at known receiver locations, consider the linear model as shown in Equation 36:

$$d(t, x)=s(t, x)+w(t, x) \qquad [36]$$

where d(t, x) is the measurement at time t and receiver position x, s(t, x) is the coherent signal and w(t, x) is the additive noise.

In this model, the coherent signal s(t, x) consists of the acoustic signal and the coherent vibration noise, whereas, the incoherent noise n(t, x) represents calibration and modelling errors, perturbations, and any other wideband noise, as shown in the Fourier expansion of the coherent signal in Equation 37.

$$s(x, f) = \frac{1}{\sqrt{P}} \sum_{[=-P/2}^{P/2-1} e^{j\frac{2\pi xp}{x}} \hat{s}(p, f) - \frac{x}{2} \leq x < \frac{x}{2} \qquad [37]$$

where the integer P=[XK] is the space-wavenumber-width product, X is the space-width, K is the double-sided wavenumber-width, and $\hat{s}(p, f)=(P^{1/2}X^{-1})\hat{s}(k_p, f)$ is the scaled Fourier transform coefficient at frequency f and wavenumber $k_p=p/X$.

When a set of measurements is received from a receiver array $x\in \mathbb{R}^M$, the Fourier representation may takes the matrix form as shown in Equation 38:

$$d(x, f)=F(x, k)s(k, f)+w(x, f) \qquad [38]$$

where d, $w\in \mathbb{C}^M$ are the FX domain representations of the measurement and the incoherent noise, $\hat{s}\in \mathbb{C}^P$ is the FK domain representations of the coherent signal, the measurement kernel $F=P^{-1/2} \exp(j2\pi xk^T)$ is the inverse Fourier matrix, and $k\in \mathbb{R}^P$ is the vector of uniformly spaced wavenumbers with elements p/X.

In some embodiments, since both the seismic signal and the vibration noise have compact wavenumber supports, only a subset of the corresponding Fourier coefficients are non-zero at any given frequency f:

$$d(x, f)=F(x, k')\hat{s}(k', f)+w(x, f) \qquad [39]$$

where $k'\in \mathbb{R}^N$ is a subset of the full wavenumber vector k.

The reduced dimension vector k' is a function of the signal cone, the vibration noise dispersion curve, and the wavenumber-width of the vibration noise at the frequency f. However the frequency dependence are omitted for notational brevity. It may be assumed that the receiver array x has been designed as prescribed in the previous section, and consequently the matrix F(x, k') has full column rank at all frequencies of interest.

The regression problem as shown in Equation 39 corresponds to estimating the coefficients ŝ(k', f) using the measurement d(x, f), and any additional information on acoustic signal, vibration noise and the incoherent noise w(x, f). Once an estimate of these Fourier coefficients are available at a frequency f, the coherent part of the measurement may be computed at any desired output grid $y \in \mathbb{R}^P$ at that frequency by using the interpolation rule as shown in Equation 40:

$$s_{est}(y, f) = F(y, k') s_{est}(k', f) \qquad [40]$$

and then the time-space domain expression of the signal may be computed by inverse Fourier transformation as shown in Equation 41:

$$s_{est}(y, t) = \int e^{j2\pi ft} s_{est}(y, f) dk \qquad [41]$$

As will be discussed in greater detail below, the amplitude vector ŝ may be estimated using statistical estimation techniques. For example, it may be assumed that at each frequency f, the additive noise w(x) and the amplitude vector ŝ(k) are realizations of the stochastic processes $\underline{W}(x)$ and $\hat{\underline{S}}(k)$ with probability density functions $p_w(w)$ and $p_s(\hat{s})$, respectively. The frequency dependence of the variables may be omitted to simplify the notation. $\underline{W}(x)$ and $\hat{\underline{S}}(k)$ are may be assumed to be independent from each other and also the stochastic processes at different frequencies are also independent.

The incoherent noise may be modeled as a multivariate complex normal process with joint probability density function as shown below in Equation 42:

$$p_{\underline{w}}(w) = \frac{1}{\pi^M |C_{\underline{w}}|} \exp - w^H C_{\underline{w}}^{-1} w, \ w \in \mathbb{C}^M \qquad [42]$$

where $C_W = E[\underline{WW}^H]$ is the complex covariance matrix, $|C_W|$ is the determinant of the covariance matrix. The multivariate normal distribution in Equation 42 has zero mean. It is said to be circularly symmetric because the random variables $\underline{W}$ and $e^{ia}\underline{W}$ have identical distributions for any $\alpha \in \mathbb{R}$.

There may be several alternatives to choose from for the distribution of the Fourier coefficients. For purposes of discussion, the generalized normal distribution may be used due to its flexibility to model different phenomena. The probability density function of a random variable $\underline{X}$ with a generalized normal distribution has the following form as shown in Equation 43:

$$p_{\underline{x}}(s; \mu, \sigma, \tau) = \frac{\tau \Gamma^{1/2}(3/\tau)}{2\sigma \Gamma^{3/2}(1/\tau)} \exp\left(-\left|\frac{x - \mu}{\sigma}\right|^\tau \frac{\Gamma^{3/2}(3/\tau)}{\Gamma^{\tau/2}(1/\tau)}\right) \qquad [43]$$

where $\Gamma(\alpha) = \int_0^\infty e^{-t} t^{\alpha-1} dt$ is the complete Gamma function, $\mu$ is the mean, $\sigma^2$ is the variance, and $\tau > 0$ is the shape parameter. Two important special cases of the generalized normal distribution are obtained by setting $\tau = 1$, which gives the Laplace distribution; and $\tau = 2$, which gives the complex normal distribution.

It may be further assumed that the Fourier coefficients are zero mean and independently distributed. Hence, the joint probability density function of the Fourier coefficient vector is the product of the individual density functions as shown in Equation 44:

$$p_{\underline{s}}(\hat{s}) = \prod_{n=1}^N p_x(x; \mu, \sigma_n, \tau)$$
$$= \frac{\tau^N \Gamma^{N/2}(3/\tau)}{2^N |C_{\underline{s}}|^{1/2} \Gamma^{3N/2}(1/\tau)} \exp\left(-\left\|C_{\underline{s}}^{-1/2}\hat{s}\right\|_\tau^\tau \frac{\Gamma^{\tau/2}(3/\tau)}{\Gamma^{\tau/2}(1/\tau)}\right) \qquad [44]$$

where the covariance matrix $C_s = diag(\sigma_1^2, \ldots \sigma_N^2)$ is a diagonal matrix.

In some embodiments, the method maximum likelihood estimation (MLE) finds the value an unknown parameter as the one that maximizes its likelihood function. The likelihood function is closely related to the probability density function (PDF). While the PDF $p_x(x; \theta)$ of a random variable $\underline{X}$ is a function of the sample point x, and is parameterized with a variable $\theta$; the likelihood function $\mathcal{L}(\theta|x) = p_x(x; \theta)$ is a function of the variable $\theta$ and is computed at fixed realization of the random variable $\underline{X}$. In other words, for the PDF $p_x(x; \theta)$: x is the variable and $\theta$ is fixed; and for the likelihood function $\mathcal{L}(\theta|x)$: $\theta$ is the variable and x is fixed.

For the linear model shown in Equation 39, the likelihood function of the Fourier coefficient vector ŝ, given a realization of the measurement vector d is $$\mathcal{L}(\hat{s}|d) = p_{\underline{w}}(d - F\hat{s}) \qquad [45]$$
$$= \frac{1}{\pi^M |C_{\underline{w}}|} \exp\left(-(d - F\hat{s})^H C_{\underline{w}}^{-1}(d - F\hat{s})\right)$$

The maximum likelihood estimation method finds the value of the parameter vector ŝ as the one that maximizes the likelihood function as shown below in Equation 46:

$$\hat{s}_{ML} = \arg \max_{\hat{s}}[\mathcal{L}(\hat{s}|d)] \qquad [46]$$

The exponential function has the largest value when its exponent is minimum. Therefore, the ML estimate is the solution to the problem as shown in Equation 47:

$$\hat{s}_{ML} = \min_{\hat{s}} \left\|C_{\underline{w}}^{-1}(d - F\hat{s})\right\|^2 \qquad [47]$$

Taking the gradient of the quadratic function with respect to ŝ, we get the normal equation:

$$(F^H C_W^{-1} F) s_{ML} = F^H C_W^{-1} d \qquad [48]$$

Alternatively, Equation 48 may be solved using complete orthogonal decomposition as is known in the art. By applying QR factorization with column pivoting to $F^H C_W^{-1/2}$, to obtain Equation 49.

$$F^H C_W^{-1/2} = QRP \qquad [49]$$

where Q is an N×N orthogonal matrix, R is an N×M upper triangular, and P is an M×M permutation matrix.

Then by applying a reduced QR factorization without pivoting to $R^H$, Equation 50 may be obtained:

$$R^H = Z_1 T_1 \qquad [50]$$

where $Z_1$ is an M×N matrix with unitary columns, and $T_1$ is an N×M upper triangular matrix.

In some embodiments, the matrix decomposition of Equation 51 may be a complete orthogonal factorization.

$$C_W^{-1/2}F = P^T Z_1 T_1 Q^H \tag{51}$$

With Equation 52, the ML solution may be computed by first solving the following system for $s_1$ via backward substitution as shown in Equation 53:

$$\|C_W^{-1/2}(d-F\hat{s})\|^2 = \|Z_1^H P C_W^{-1/2}d - T_1 Q^H \hat{s}\|^2 \tag{52}$$

$$T_1 s_1 = Z_1^H P C_W^{-1/2}d \tag{53}$$

and by multiplying Equation 53 by Q:

$$\hat{s} = Q\hat{s}_1 \tag{54}$$

In some embodiments, the method of maximum a posteriori (MAP) estimation finds the value of an unknown parameter as the one that maximizes its posterior distribution. In Bayesian inference, the posterior distribution refers to the probability density function of the parameter to be estimated after observation of a related quantity. As an example, for the linear model shown in Equation 39, the distribution of $\hat{S}$ before making any measurement is called as the a priori PDF, and the distribution of $\hat{S}$ after acquiring the measurement d is called as the posterior PDF.

The posterior PDF of $\hat{S}$ may be calculated by using the Bayes's theorem which states that the posterior PDF is the product of the a priori PDF $p_s(\hat{s})$ and the conditional PDF $p_{D|S}(d|\hat{s})$ normalized with the PDF of the measurement $p_D$ (d) as shown below in Equation 55:

$$p_{S|D}(\hat{s}\mid d) = \frac{p_{\hat{s}}(\hat{s})p_{D|\hat{s}}(d\mid \hat{s})}{p_D(d)} \tag{55}$$

By using the independence of the incoherent noise and the Fourier coefficients we can write the posterior PDF as shown below in Equation 56:

$$p_{S|D}(\hat{s}\mid d) = \frac{p_{\hat{s}}(\hat{s})p_w(d - F\hat{s})}{\int p_{\hat{s}}(\hat{s})p_w(d - F\hat{s})d\hat{s}} \tag{56}$$

Hence, the MAP estimate of the Fourier coefficient vector $\hat{S}$ is the mode of the posterior distribution Equation 55. Since the denominator of Equation 59 is a constant, the MAP estimate is the value that maximizes the numerator shown in Equation 57:

$$\hat{s}_{MAP} = \arg\max_{\hat{s}}\left[p_{\hat{s}}(\hat{s})p_w(d - F\hat{s})\right] \tag{57}$$

Substituting Equations 42 and 46 into Equation 57, it follows the MAP estimate is
the minimizer of a convex cost function $J(\hat{s})$ shown in Equation 58:

$$J(\hat{s}) = \frac{1}{2}\left\|C_w^{-1/2}(d - F\hat{s})\right\|_2^2 + \left\|C_{\hat{s}}^{-1/2}\hat{s}\right\|_\tau^\tau\left(\frac{\Gamma(3/\tau)}{\Gamma(1/\tau)}\right)^{\tau/2} \tag{58}$$

Equation 58 may be an $\ell_2$ cost function with an $\ell_\tau$ penalty term where $\tau$ is the shape parameter of the generalized normal distribution. The special cases of choosing the shape parameter $\tau$ as one and two are discussed below.

By choosing the shape parameter of the generalized normal distribution as $\tau=1$, the zero-mean Laplace distribution of Equation 59 may be obtained $$P_{\hat{s}}(\hat{s}) = \frac{1}{2^{N/2}\left|C_{\hat{s}}\right|^{1/2}}\exp\left(-\left\|C_{\hat{s}}^{-1/2}\hat{s}\right\|_1^1 2^{1/2}\right) \tag{59}$$

Thus, the cost function for the MAP estimate becomes Equation 60:

$$J(\hat{s}) = 1/2\|C_W^{-1/2}(d-F\hat{s})\|_2^2 + 2^{1/2}\|C_S^{-1/2}\hat{s}\|_1^1 \tag{60}$$

Equation 60 may be a convex cost function that appears in many problems such as sparse approximation, compressed sensing and de-noising. Although the non-smoothness of the $\ell_1$-norm prevents an analytical solution, many numerical methods exist to compute the solution efficiently. Some of these algorithms include Gradient Projection (GP), Homotopy, Iterative Shrinkage-Thresholding (ITS), Proximal Gradient (PG) and Augmented Lagrange Multiplier (ALM) methods. Alternatively, heuristic methods such as orthogonal matching pursuit (OMP) and least angle regression (LARS) provide approximate solutions.

A prominent features of the Laplace distribution compared with the normal distribution is its heavy tails. The heavy tails of the distribution allows occasional large values for some entries of the vector $\hat{s}$ while driving the others towards zero. This property of the Laplace distribution promotes sparse solutions.

Although some applications search for a sparse solution, in some other applications the sparsity of the solution is already known beforehand. The interpolation of acoustic signal and coherent vibration noise from a set of non-uniform receivers is one of those problems. In such cases, we don't have to explicitly search for an N—sparse solution within a P-dimensional space with P>>N. Because, at each frequency f, we already know the signal cone for the acoustic signal, the dispersion wavenumber of the transverse vibrations and the effective wavenumber-width of the transverse noise which determines which of the N Fourier coefficients are non-zero. For this type of a scenario, one may have an analytical solution that can be implemented efficiently.

For example, by choosing the shape parameter of the generalized normal distribution as $\tau=2$, the multivariate complex normal distribution of Equation 61 may be obtained:

$$P_{\hat{s}}(\hat{s}) = \frac{1}{2^{N/2}\left|C_{\hat{s}}\right|^{1/2}}\exp\left(-\frac{1}{2}\left\|C_{\hat{s}}^{-1/2}\hat{s}\right\|_2^2\right) \tag{61}$$

Substituting Equation 42 and Equation 61 into Equation 58, it can be shown that the posterior distribution is normal with the mean as shown in Equation 62:

$$E[\hat{S}|d] = (C_S^{-1} + F^H C_W^{-1}F)^{-1}F^H C_W^{-1}d \tag{62}$$

and covariance:

$$Cov[\hat{S}|d] = (C_S^{-1} + F^H C_W^{-1}F)^{-1} \tag{63}$$

Since the mode of the normal distribution is the mean, the MAP estimator is the mean of the posterior distribution of Equation 64:

$$S_{MAP}=(C_s^{-1}+F^HC_w^{-1}F)^{-1}F^HC_w^{-1}d \qquad [64]$$

Woodbury's identity gives an alternative expression for the MAP estimator as shown in Equation 65:

$$S_{MAP}=C_sF^H(C_w+FC_sF^H)^{-1}d \qquad [65]$$

The matrices that need to be inverted are N-dimensional in Equation 64 and M-dimensional in Equation 65, computationally it is more advantageous to use Equation 64 when M>N and to use Equation 65 when the converse is true. There are several recommended approaches to compute $S_{MAP}$ from Equation 64 or 65. Similar to the ML estimate computation, complete orthogonal decompositions may be used. Alternatively, Cholesky factorization may be used which has slightly less computational load.

It is informative to analyze the limiting forms of the MAP estimator. If the covariance of the priors is zero, $C_S=0$, the MAP estimator becomes the mean of the prior (assumed to be zero in this discussion). This is equivalent to having a deterministic prior that is independent of the data. On the other hand, when the priors are uninformative, they have infinite covariance, $C_s^{-1}=0$. In this case, the estimator is independent of the priors and it is equivalent to the ML estimator as shown in Equation 66:

$$S_{ML}=(F^HC_w^{-1}F)^{-1}F^HC_w^{-1}d \qquad [66]$$

The choice of normal priors allows us to derive analytical expressions for the performance of the estimator. The mean square error (MSE) of an estimator may be defined as the variance of the estimation error as shown in Equation 67:

$$MSE(\hat{S}) \triangleq E\|\hat{S}-s^\circ\|_2^2 \qquad [67]$$

where the estimator $\hat{S}$ is a random variable and $\hat{s}^\circ$ is the true value.

A well-known identity in the estimation theory is that the mean-squared error is the sum of the variance of the estimator and the squared bias of the estimator as shown in Equation 68:

$$MSE(\hat{S})=E\|\hat{S}-E[\hat{S}]\|_2^2+\|b\|_2^2 \qquad [68]$$

where the variance is equivalent to the trace of the covariance matrix shown in Equation 69:

$$E\|\hat{S}-E[\hat{S}]\|_2^2=tr[Cov(\hat{S})] \qquad [69]$$

and the bias is the difference of the expected value of $\hat{S}$ and the true value $\hat{s}^\circ$ as shown in Equation 70:

$$b=E[\hat{S}]-s^\circ \qquad [70]$$

The first component of the MSE the variance of the estimator (precision) and the other one measures its bias (accuracy). For an estimate to have a small MSE, the combined value of the variance and the bias should be small. For example, to compute the MSE of the MAP and the ML estimators, the measurement model $\underline{D}=F\hat{s}^\circ+\underline{W}$ may be substituted into Equation 64 and Equation 66:

$$S_{MAP}=(C_s^{-1}+F^HC_w^{-1}F)^{-1}F^HC_w^{-1}(Fs^\circ+\underline{W})$$

$$S_{ML}=\hat{s}^\circ+(F^HC_w^{-1}F)^{-1}F^HC_w^{-1}\underline{W} \qquad [71]$$

Expected values of the estimators may be:

$$E[S_{MAP}]=(C_s^{-1}+F^HC_w^{-1}F)^{-1}F^HC_w^{-1}F\hat{s}^\circ$$

$$E[S_{ML}]=\hat{s}^\circ \qquad [72]$$

and the covariance matrices of the estimators may be:

$$C_{MAP}=(C_s^{-1}+F^HC_w^{-1}F)^{-1}(F_HC_w^{-1}F)(C_s^{-1}+F^HC_w^{-1}F)^{-1}$$

$$C_{ML}=(F^HC_w^{-1}F)^{-1} \qquad [73]$$

Using Equation 70 and Equation 72, the biases of the MAP and the ML estimators may be found as shown in Equation 74:

$$b_{MAP}=E[S_{MAP}]-s^\circ=-(C_s^{-1}+F^HC_w^{-1}F)^{-1}C_s^{-1}\hat{s}^\circ$$

$$b_{ML}=E[S_{ML}]-\hat{s}^\circ=0 \qquad [74]$$

Hence, the ML estimator has zero bias, and it is therefore unbiased. On the other hand, the bias of the MAP estimator depends on the true value of the Fourier coefficients, and therefore, it is biased. In this manner, the covariance matrix of the MAP estimator may be written in terms of that of the ML estimator as shown in Equation 75:

$$C_{MAP}^{-1}=C_{ML}^{-1}+C_s^{-1}(2C_s+C_{ML})C_s^{-1} \qquad [75]$$

which implies that the MAP estimator has a smaller variance than the ML estimator:

$$C_{MAP}^{-1} > C_{ML}^{-1} \Rightarrow C_{MAP} < C_{ML} \qquad [76]$$

$$\Rightarrow tr[C_{MAP}] < tr[C_{ML}]$$

where the expression $C_{MAP}<C_{ML}$ means that the matrix $C_{ML}-C_{MAP}$ is positive definite.

Hence, the ML estimator has a smaller bias; however, the MAP estimator has a smaller variance. Although having an unbiased estimator may be tempting, Equation 68 shows that to get a small MSE it may be necessary to have the combined value of the estimator variance and the bias be small. This brings to the possibility that by allowing a small bias in the estimator, the estimator variance could be significantly reduced. This is particularly true, when the columns of the Fourier matrix F are almost co-linear. In this case, the ML estimator is ill conditioned because the matrix $(F^HC_w^{-1}F)$ is almost singular, and the covariance matrix of the ML estimator as given in Equation 73 is very large. As discussed above, this happens in the presence of spatial aliasing or very closely spaced receivers. On the other hand, the MAP estimator will always be stable as long as the covariance matrix of the priors is invertible.

By having a smaller estimator covariance, the MAP estimator could deliver a smaller mean-square error. The covariance of the priors control the trade-off between the bias and the mean-square error. If the priors are too strong, than the estimate will be too biased whereas, very weak priors may be insufficient to reduce the mean-square error. Hence, the appropriate choice of the priors is an important part of the MAP estimation.

In some embodiments, a marine seismic streamer may include 56 MEMS per 100 meter section. Here, an optimized sparse sensor layout has at least 1.78 meter average spacing. In that particular example, 16 of the MEMS sensors have been placed on a uniform grid with 6.25 meter spacing, and the other 40 MEMS sensors have been placed pseudo-randomly. Accordingly, in some embodiments at least two of the plurality of MEMS sensors may be placed adjacent to one another having a 0.625 meter or less spacing therebetween for solid streamers and 0.39 meter or less spacing therebetween for gel-filled streamers. One or more adjacent MEMS sensors of the plurality of MEMS sensors may include an average spacing therebetween of between 1 and 4 meters. For example, the average spacing may be approximately 1.78 meters (e.g., 100 meters/56 sensors) as discussed above. In some implementations, the average spacing may be approximately 3.125 meters (e.g., 100 meters/32 sensors). In another example, the average spacing may be approximately 1.25 meters (e.g., 100 meters/80 sensors). The marine seismic streamer may further include an electronics core extending axially through an inside portion of the outer skin, wherein the plurality of sensors (e.g., particle motion sensors, MEMS sensors, etc.) are in electrical communication with the electronics core. It should be noted that the electronics core or system may be located at any suitable location along or within the seismic streamer. This electronics core may include, but is not limited to, those discussed herein with reference to FIGS. 1-15. While an example with 56 sensors has been discussed, it will be appreciated that any number of sensors may be used within the scope of the present disclosure. For example, the number of sensors in this sparse array arrangement as discussed herein may be in the range of about 32 sensors to 100 sensors per 100 meter streamer. In preferred embodiments, the number of sensors may include between 56 and 80 sensors. In some embodiments, the number of sensors may range from about 56 to about 80 sensors.

As discussed above, in some embodiments a marine seismic streamer may include an outer skin formed in a longitudinally extending tubular shape wherein an inner surface of the outer skin defines an internal volume containing a gel substance such as the filler material depicted in FIG. 8. The marine seismic streamer may also include a plurality of sensors and a plurality of hydrophones associated with the outer skin, wherein the plurality of sensors includes a pre-determined minimal number of sensors in the seismic streamer for every continuous 100 meter length of seismic streamer (e.g. as shown in FIGS. 11-15).

In some embodiments, the marine seismic streamer may also include an electronics system extending through an inside portion of the seismic streamer (e.g., axially and/or within the outer skin), wherein the plurality of sensors are in electrical communication with the electronics system. Again, this electronics system may include aspects of those discussed in any of FIGS. 1-15.

In some embodiments, the pre-determined minimal number of sensors may include a plurality of sensors having a subset of sensors that are spaced more closely together than one or more remaining sensors of the plurality of sensors. The subset of sensors may include a first sensor attached to a first side of the outer skin and a second sensor attached to a second side of the outer skin. The plurality of sensors may include three component ("3C") sensors. The marine seismic streamer may include one or more seismic streamer orientation detection devices configured to determine a relative position of at least a portion of the seismic streamer.

Figure 11:
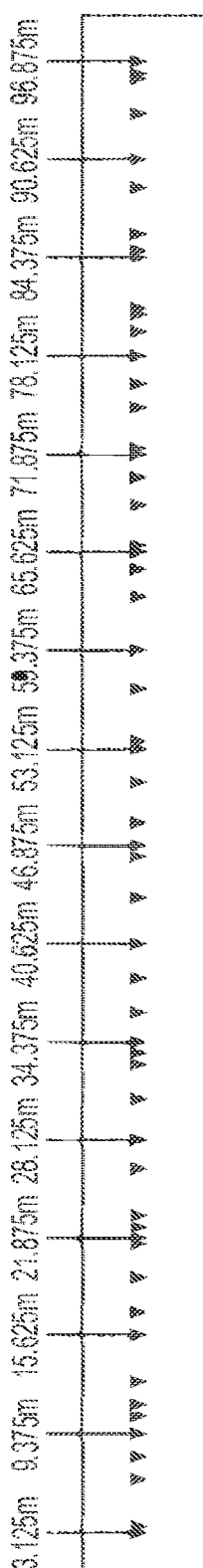
FIG. 11 illustrates an example streamer section having sensors included therein according to one or more aspects of the disclosure.
Figure 12:
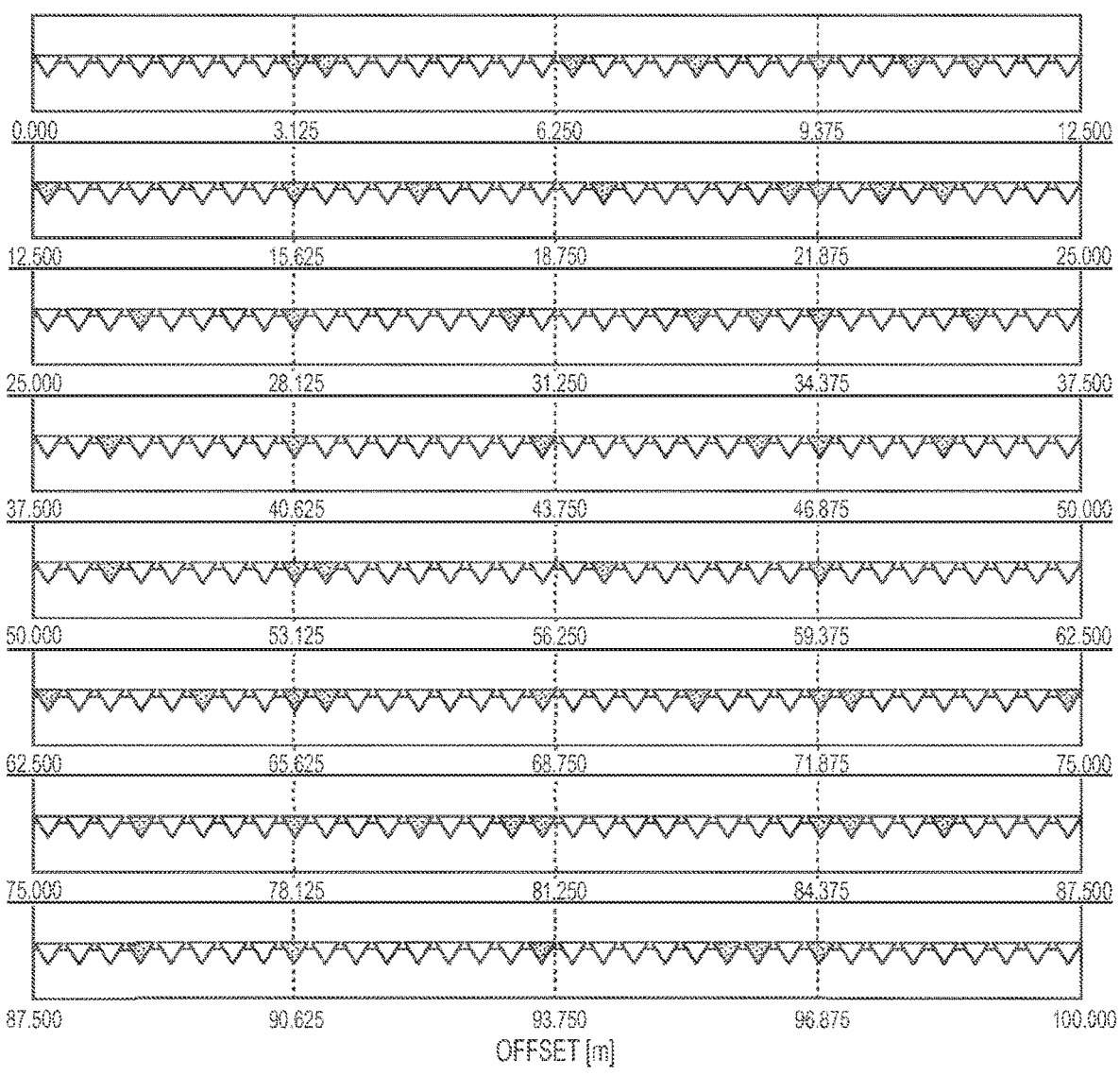
FIG. 12 illustrates an example streamer section having sensors included therein according to one or more aspects of the disclosure.

In some embodiments, it may be assumed that the accelerometer noise has a sparse representation, while allowing for the particle acceleration of the seismic signal to exist anywhere and everywhere within the so-called signal cone in frequency-wavenumber domain. Consequently, the signal component may actually be oversampled, as the average accelerometer spacing may be shorter than that required by Nyquist for all seismic signal wavelengths. Furthermore, the optimized non-uniform accelerometer layout may also be constrained to have a sensor along a set distance (e.g., every 6.25 m as shown in FIG. 11) that may be practically co-located with a hydrophone, a real measurement for the output from the system.

Figure 13:
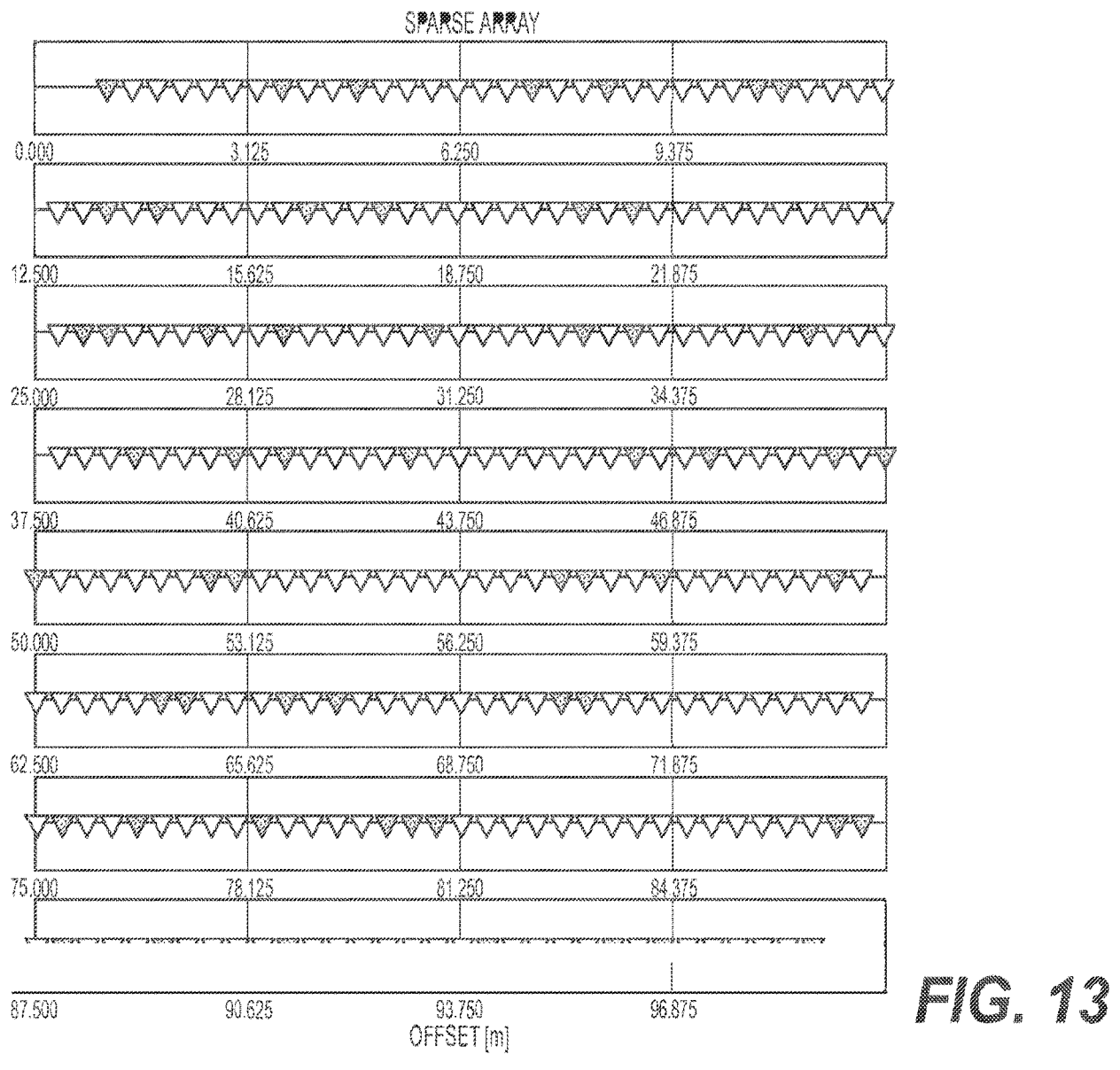
Figure 14:
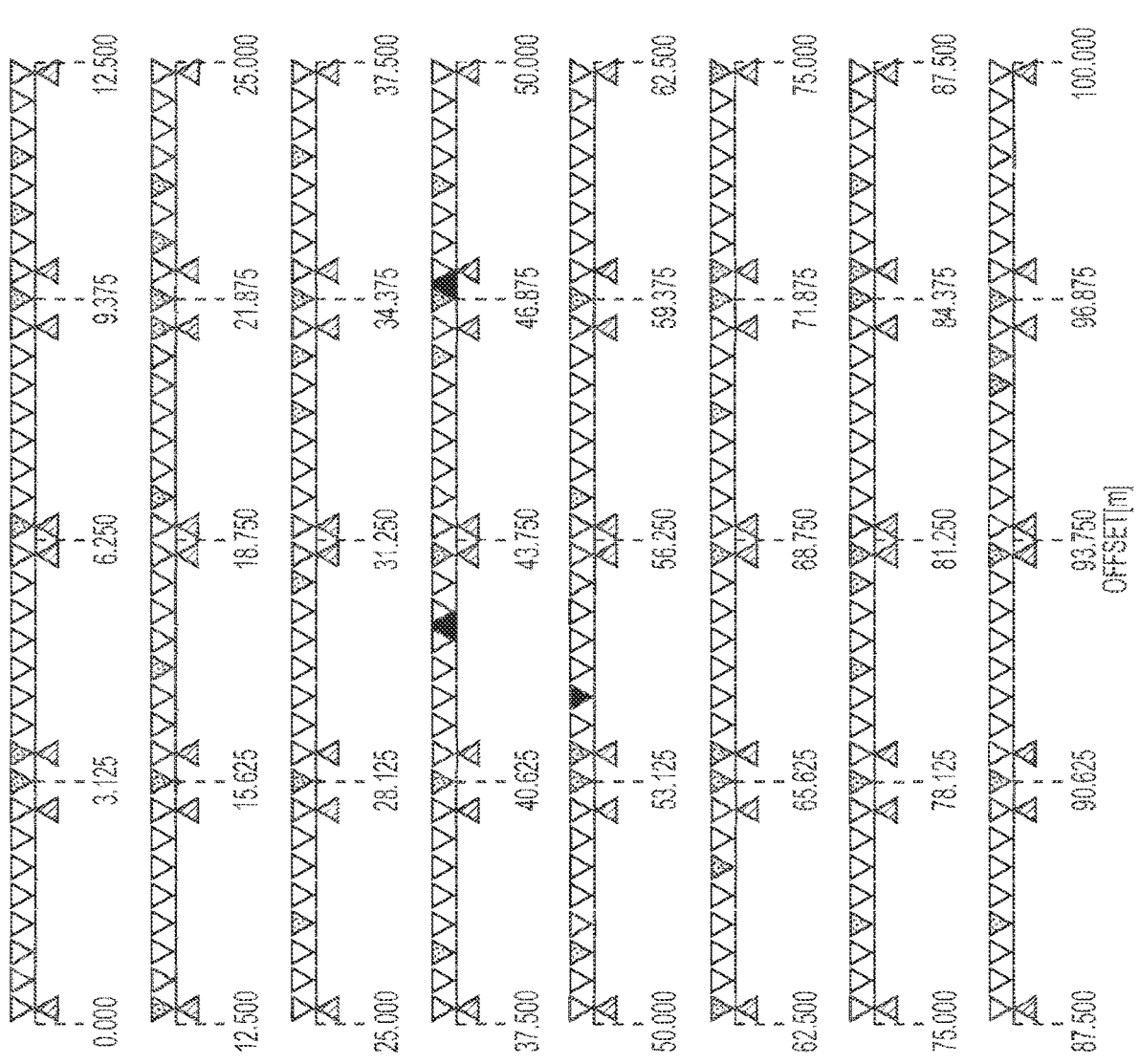
FIG. 14 illustrates an example streamer section having sensors included therein according to one or more aspects of the disclosure.

Referring to FIGS. 13 and 14, schematics depicting comparison of traditional and sparse array arrangements are provided. In FIG. 13, schematics depict a uniform Nyquist (all triangles) spacing and an aperiodic sparse (shaded triangles only) receiver layout. The sparse layout of shaded triangles can have 56 sensors, as shown. All the triangles together (light and shaded) coincide with a dense uniform grid according to traditional Nyquist spacing, with 6.25/17 meter spacing, assuming certain noise characteristics, as an example. In other words, adhering to the classical Nyquist sampling theorem to acquire unaliased signal and the coherent noise would require placing a seismic sensor at least at every triangle position (light and dark) shown in FIG. 13. Similarly, FIG. 14 shows a series of triangles above a line (white and shaded). The triangles above the lines together show the spacing needed to meet the traditional Nyquist sampling spacing, presuming various noise characteristics, for example. However, this would result in 272 sensors per 100 meter section of marine seismic streamers. FIG. 14 show sparse sensor configurations too, by way of light shaded triangles (above the line) and dark shaded triangles (below the lines) representing sparse array arrangements. In FIG. 14, the dark shaded triangles (below the lines) show an irregular sparse layout. That sparse layout repeats at 12.5 m along a length of a streamer. The light shaded triangles (above the lines) form an irregular sparse layout. That layout repeats over every 100 m or more length over a streamer, i.e. a streamer section length. The layout may repeat over various lengths, but those lengths of repeating patterns may always be 12.5 m or longer. For example and in some implementations, the sensors (e.g., particle motion sensors, MEMS sensors, etc.) may be nonuniformly distributed over a continuous 100 m length of a streamer in a pattern that repeats at a distance greater than 50 m. It should be appreciated that the FIGS. 13-14 are meant to only illustrate the axial spacing of sensors along a streamer, and not the lateral or radial spacing of the sensors. According to another embodiment, the number of sensors in a sparse array arrangement as discussed herein may be in the range of about 32 sensors to 100 sensors per 100 meter continuous streamer length. In embodiments, the number of sensors may include between 56 and 80 sensors. In some embodiments, the number of sensors may range from about 56 to about 80 sensors. It should be appreciated that the illustrations in FIGS. 13-14 are based on a uniformly spaced base grid. However, in practice, when defining the spacing of a sparse array, it is not needed to base that spacing on a uniformly spaced base grid, e.g., simply remove sensors from a uniformly spaced base grid.

In some embodiments, the sensors for the periodic layout cover the full section whereas the sensors for the aperiodic layout avoid the start and end of the section. The rationale behind this design choice for the aperiodic layout is based upon, at least in part, a prior knowledge of the noise characteristics. For example, in a towed streamer, the noise is strongest at the connectors, and muting those sensors and interpolating them typically provides higher data quality than trying to remove the noise from those sensors. Hence, rather than putting sensors at locations where the sensors could be muted in processing, the sensors may be distributed to the inner parts of the section Embodiments of the present disclosure may build upon proven hydrophone technology, while embracing compressive sensing theory in designing the accelerometer sensor layout. In some embodiments, and in order to enable the layout to work with standard processing workflows, the present disclosure may include a bespoke coherent signal and noise regression (CSNR) method to regularize and noise attenuate data recorded by the non-uniformly sampled accelerometers. CSNR is physics based and signal blind. It uses known physical properties of the cable to guide the noise attenuation, and makes no assumptions about the seismic signal; subsurface reflection gradients may exist anywhere and everywhere within the signal cone. This conservative approach is signal safe, while delivering effective gradient noise attenuation for subsequent processing like broadband 3D deghosting. CSNR outputs noise attenuated accelerometer data at any desired uniform (inline) grid. Embodiments of the present disclosure may be used to facilitate crossline wavefield reconstruction using the new optimized sparse accelerometer layout included herein.

For example and as discussed above, the non-uniform spacing of sensors may lead to challenges with conventional, uniform spacing-based sampling. Embodiments included herein may interpret the seismic data from a set of non-uniformly spaced sensors as a statistical estimation problem. The inputs to an estimation algorithm (e.g., CSNR) may be the samples of the data at known receiver locations, the statistics of the unknown quantities and the spectral support of the coherent signal that comprises both acoustic signal and the vibration noise. The method may compute the maximum likelihood and maximum a posteriori estimates of the Fourier coefficients, then the method may use the linear regression to compute the signal and the vibration noise at any desired location. This method of interpolation may be generally referred to as the Coherent Signal and Noise Regression (CSNR) algorithm and its specific version implemented in the frequency and space domain as the FX-CSNR algorithm.

Embodiments included herein may provide a method for performing a seismic survey is provided. The method may include towing a marine seismic streamer having an outer skin formed in a longitudinally extending tubular shape, an inner surface of the outer skin defining an internal volume containing a gel substance. The method may also include acquiring seismic data using a plurality of sensors and a plurality of hydrophones associated with the outer skin, wherein the plurality of sensors include a pre-determined minimal number of sensors in the seismic streamer for every continuous 100 meter length of seismic streamer. The method may further include communicating the seismic data to an electronics system extending axially through an inside portion of the outer skin, wherein the plurality of sensors are in electrical communication with the electronics system.

Figure 15:
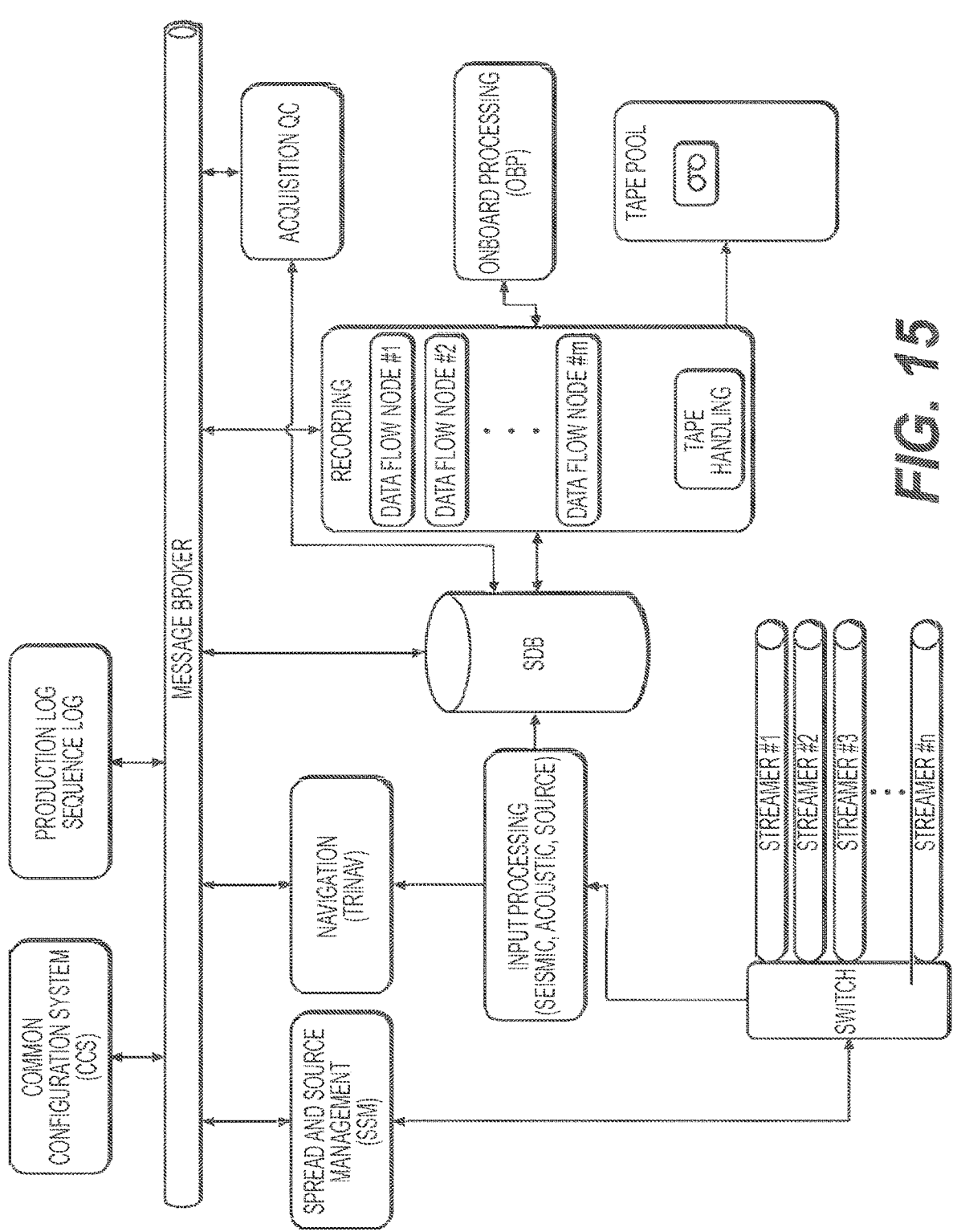
FIG. 15 illustrates a system for processing data received from a marine seismic streamer according to one or more aspects of the disclosure.

Referring now to FIG. 15, an example of a data processing system associated with the marine seismic streamers discussed herein is provided. The data volumes and preprocessing requirements may require substantial hardware on the vessel. The seismic streamer described herein is able to meet those requirements without substantial onboard hardware and may be scalable to operational requirements.

In some embodiments, the recording system may be designed for high data volume and velocity. The recording of single-sensor data enables advanced preprocessing of the acquired data in near real time, including the identification of bad sensors and rotation of the accelerometer sensors to horizontal and vertical components. The recording system can deliver the data in a true continuously recorded raw format or preprocessed and noise attenuated format in Society of Exploration Geophysicists (SEG-D) shot records on tape. Data can also be delivered directly to any processing system through a network-mounted drop box.

In some embodiments, the in-sea equipment may be controlled and monitored through visual user interfaces with built-in alarms and equipment drill-down functionality. The entire instrument room may be controlled through a single configuration system. This ensures there are no data surprises and enables streamlining of downstream processing. The network infrastructure, storage, processing servers, tapes and front-end display servers use standard off-the-shelf components for high reliability and reduced cost.

The block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

The terminology used herein is for the purpose of describing particular embodiments and is not intended to be limiting of the disclosure. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the marine seismic streamer described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A marine seismic streamer comprising a plurality of particle motion sensors and a plurality of hydrophones:
   wherein a first subset of the particle motion sensors is uniformly spaced along the streamer at a spacing that satisfies the Nyquist interval for seismic signals, and
   wherein the remaining particle motion sensors in a second subset are non-uniformly spaced along the streamer so that the average spacing of the particle motion sensors in the first and second subsets is above the Nyquist interval for a specific noise mode present on the streamer, so that the particle motion sensors support compressive sensing of the noise mode, wherein the specific noise mode has a phase velocity slower than the phase velocities of other noise modes present on the streamer.

2. The marine seismic streamer of claim 1 where the noise mode is a transverse noise mode.

3. The marine seismic streamer of claim 1 where the noise mode is a longitudinal noise mode.

4. The marine seismic streamer of claim 1 where the noise mode is a torsional noise mode.

5. The marine seismic streamer of claim 1 where the streamer is a gel-filled streamer.

6. The marine seismic streamer of claim 1 where the streamer is a solid streamer.

7. The marine seismic streamer of claim 1 where the plurality of hydrophones is collocated with the first subset of particle motion sensors.

8. The marine seismic streamer of claim 1 where the particle motion sensors are accelerometers.

9. The marine seismic streamer of claim 8 where the accelerometers are MEMS accelerometers.

10. A method for performing a marine seismic survey comprising: towing a marine seismic streamer having a plurality of particle motion sensors and a plurality of hydrophones,
   wherein a first subset of the particle motion sensors is uniformly spaced along the streamer at a spacing that satisfies the Nyquist interval for seismic signals, and
   wherein the remaining particle motion sensors in a second subset are non-uniformly spaced along the streamer so that the average spacing of the particle motion sensors in the first and second subsets is above the Nyquist interval for a specific noise mode present on the streamer, so that the particle motion sensors support compressive sensing of the noise mode; and
   using the plurality of particle motion sensors and the plurality of hydrophones to acquire seismic data including signal and noise, wherein the specific noise mode has a phase velocity slower than the phase velocities of other noise modes present on the streamer.

11. The method of claim 10 where the noise mode is a transverse noise mode.

12. The method of claim 10 where the noise mode is a longitudinal noise mode.

13. The method of claim 10 where the noise mode is a torsional noise mode.

14. The method of claim 10 where the streamer is a gel-filled streamer.

15. The method of claim 10 where the streamer is a solid streamer.

16. The method of claim 10 where the plurality of hydrophones is collocated with the first subset of particle motion sensors.

17. The method of claim 10 where the particle motion sensors are accelerometers.

18. The method of claim 17 where the accelerometers are MEMS accelerometers.

* * * * *